United States Patent
Lampert et al.

(10) Patent No.: US 10,899,938 B2
(45) Date of Patent: Jan. 26, 2021

(54) COMPOSITIONS COMPRISING DIATOM FRUSTULES AND APPLICATIONS THEREOF

(71) Applicant: Portland State University, Portland, OR (US)

(72) Inventors: Lester Lampert, Portland, OR (US); Haiyan Li, Beaverton, OR (US)

(73) Assignee: Portland State University, Portland, OR (US)

( * ) Notice: Subject to any disclaimer, the term of this patent is extended or adjusted under 35 U.S.C. 154(b) by 0 days.

(21) Appl. No.: 16/433,111

(22) Filed: Jun. 6, 2019

(65) Prior Publication Data

US 2019/0300727 A1    Oct. 3, 2019

Related U.S. Application Data

(63) Continuation of application No. 15/597,989, filed on May 17, 2017, now abandoned, which is a
(Continued)

(51) Int. Cl.
*C09D 7/62* (2018.01)
*C09D 7/40* (2018.01)
(Continued)

(52) U.S. Cl.
CPC .............. *C09D 7/62* (2018.01); *B01J 21/063* (2013.01); *B01J 23/745* (2013.01); *B01J 35/002* (2013.01);
(Continued)

(58) Field of Classification Search
CPC .................................................... B01J 35/004
See application file for complete search history.

(56) References Cited

U.S. PATENT DOCUMENTS 5,281,445 A    1/1994    Khare
6,641,908 B1   11/2003   Clough
(Continued)

FOREIGN PATENT DOCUMENTS

CN    102329546    1/2012
JP    H08266897    10/1996
(Continued)

OTHER PUBLICATIONS

Hernadi et al., "Synthesis of MWNT-based composite materials with inorganic coating," *Acta Materialia* 51:1447-1452, 2003.
(Continued)

*Primary Examiner* — Liam J Heincer
(74) *Attorney, Agent, or Firm* — Klarquist Sparkman, LLP

(57) ABSTRACT

Disclosed embodiments concern a composition comprising a diatom frustule and two or more photocatalytic nanoparticles dispersed on the surface of the frustule. Also disclosed are embodiments of a method for making the composition. The nanoparticles are dispersed such that they are separate and not in physical contact with each other. An average distance between the nanoparticles may be from greater than 0 nm to 100 nm. The nanoparticles may comprise a dopant material. Paint compositions comprising the diatom frustule compositions are also contemplated. The diatom frustule composition may be useful for removing and/or degrading volatile organic compounds, such as those present in the atmosphere.

19 Claims, 18 Drawing Sheets

Related U.S. Application Data continuation-in-part of application No. PCT/US2015/061175, filed on Nov. 17, 2015.

(60) Provisional application No. 62/080,591, filed on Nov. 17, 2014.

(51) Int. Cl.

| | | |
|---|---|---|
| *B01J 35/00* | (2006.01) | |
| *B01J 37/03* | (2006.01) | |
| *C04B 20/10* | (2006.01) | |
| *C04B 28/02* | (2006.01) | |
| *C04B 28/14* | (2006.01) | |
| *C08K 9/12* | (2006.01) | |
| *C09D 1/00* | (2006.01) | |
| *B01J 21/06* | (2006.01) | |
| *B01J 23/745* | (2006.01) | |
| *C04B 22/06* | (2006.01) | |
| *C09D 5/00* | (2006.01) | |
| *C09D 201/00* | (2006.01) | |
| *C04B 111/20* | (2006.01) | |
| *C08K 3/36* | (2006.01) | |
| *C04B 111/00* | (2006.01) | |

(52) U.S. Cl.
CPC .......... *B01J 35/004* (2013.01); *B01J 35/006* (2013.01); *B01J 35/0013* (2013.01); *B01J 37/031* (2013.01); *C04B 20/1066* (2013.01); *C04B 22/06* (2013.01); *C04B 28/02* (2013.01); *C04B 28/14* (2013.01); *C08K 9/12* (2013.01); *C09D 1/00* (2013.01); *C09D 5/00* (2013.01); *C09D 7/67* (2018.01); *C09D 7/70* (2018.01); *C09D 201/00* (2013.01); *C04B 2111/00482* (2013.01); *C04B 2111/00827* (2013.01); *C04B 2111/2061* (2013.01); *C08K 3/36* (2013.01); *C08K 2201/011* (2013.01); *Y02W 30/91* (2015.05)

(56) References Cited

U.S. PATENT DOCUMENTS

| | | | |
|---|---|---|---|
| 6,821,621 B1 | 11/2004 | Clough | |
| 8,506,886 B2 | 8/2013 | Owen et al. | |
| 8,728,501 B2 | 5/2014 | Fan | |
| 2004/0258581 A1* | 12/2004 | Wei | B01D 53/8668 422/177 |
| 2007/0128707 A1 | 6/2007 | Rorrer et al. | |
| 2008/0206562 A1 | 8/2008 | Stucky | |
| 2012/0003146 A1 | 1/2012 | Fliermans | |
| 2012/0228236 A1 | 9/2012 | Hawkins, II et al. | |
| 2013/0118995 A1 | 5/2013 | Hawkins, II et al. | |
| 2013/0180931 A1 | 7/2013 | Owen | |
| 2014/0090578 A1 | 4/2014 | Simpson et al. | |
| 2014/0134503 A1 | 5/2014 | Lockett | |
| 2015/0287978 A1 | 10/2015 | Lockett | |
| 2015/0338403 A1 | 11/2015 | Wang | |
| 2015/0367322 A1 | 12/2015 | Sundara | |

FOREIGN PATENT DOCUMENTS

| | | |
|---|---|---|
| JP | 2000218160 | 8/2000 |
| JP | 2001019954 | 1/2001 |
| JP | 2004243212 | 9/2004 |
| JP | 2010149046 | 7/2010 |
| JP | 2014193432 | 10/2014 |
| JP | 2014193433 | 10/2014 |
| WO | WO 2009/074120 | 6/2009 |
| WO | WO 2013/000441 | 1/2013 |
| WO | WO 2014/121134 | 8/2014 |

OTHER PUBLICATIONS

International Preliminary Report on Patentability dated Dec. 14, 2016 from International Application No. PCT/US2015/061175.
International Search Report dated Mar. 31, 2016 from International Application No. PCT/US2015/061175.
Lambert et al., "Near-Infrared Selective and Angle-Independent Backscattering from Magnetite Nanoparticle-Decorated Diatom Frustules," *ACS Photonics* 1:477482, May 15, 2014.
Pelaez et al., "A review on the visible light active titanium dioxide photocatalysts for environmental applications," *Applied Catalysis B: Environmental* 125:331-349, 2012.
Sun et al., "A comparative study of different porous amorphous silica minerals supported $TiO_2$ catalysts," *Applied Catalysis A: General* 458:103-110, 2013.
Toster et al., "In situ coating of diatom frustules with silver nanoparticles," *Green Chemistry* 15(8):2060-2063, Jun. 11, 2013.
Van Eynde et al., "Biotemplated diatom silica-titania materials for air purification," *Photochemical & Photobiological Sciences* 12:690-695, Oct. 25, 2012.
Written Opinion dated Mar. 31, 2016 from International Application No. PCT/US2015/061175.
U.S. Appl. No. 10/464,942, filed Jun. 19, 2003, Wei et al.

* cited by examiner

COMPOSITIONS COMPRISING DIATOM FRUSTULES AND APPLICATIONS THEREOF

CROSS REFERENCE TO RELATED APPLICATION

This is a continuation of U.S. patent application Ser. No. 15/597,989, filed on May 17, 2017, which is a continuation-in-part of International Application No. PCT/US2015/061175, filed Nov. 17, 2015, which was published in English under PCT Article 21(2), which in turn claims the benefit of U.S. provisional patent application No. 62/080,591, filed on Nov. 17, 2014, all of which are incorporated herein by reference in their entireties.

FIELD

This disclosure relates to material compositions comprising diatom frustules and methods for making and using such compositions.

BACKGROUND

Volatile organic compounds (VOCs), including toxic molecules from petroleum-based materials, and most scents or odors, seriously deteriorate air quality, particularly in an interior environment. VOCs have been identified as being responsible for a number diseases developed in unhealthy environments. For example, exposure to petroleum-based paints has a strong correlation with cases of acute lymphoblastic leukemia in children of ages 2 to 5.9 years old. Few low-VOC paints have been developed, and some VOC-absorbing materials have been applied to temporally improve air quality. However, none of them provide continuous improvement and protection to the air quality.

$TiO_2$, doped $TiO_2$, and $TiO_2$-based hybrids are effective photocatalysts for decomposition of organic species. Nano-scale photocatalytic particles are often more efficient than micro-scale or larger particles for decontamination. However, current methods for dispersing and recycling nano-size photocatalysts from air or water are complex and expensive.

SUMMARY

Disclosed herein are embodiments of a composition that efficiently decomposes and/or degrades VOCs to form non-toxic gases. In some embodiments, embodiments of the composition comprises a diatom frustule and two or more photocatalytic nanoparticles. The nanoparticles may be dispersed on a surface of the diatom frustule such that each of the two or more nanoparticles are separate and not in direct physical contact with each other. Additionally, a portion of the surface of the (nanoparticle-decorated) diatom frustule is free from metal or metal oxide.

Also disclosed is a paint composition comprising a disclosed diatom frustule composition and paint.

The disclosure also provides a method comprising exposing a disclosed diatom frustule composition to a volatile organic compound in such a manner that the composition is also exposed to a sufficient intensity of visible light, UV light or both visible and UV light to degrade the VOCs to non-toxic gases.

Methods for making the herein described compositions are also disclosed. Embodiments of the method comprise mixing diatom frustules with a nanoparticle precursor at a first temperature to form a mixture, and heating the mixture at a second temperature to form nanoparticles evenly dispersed on a surface of the diatom frustule.

The foregoing and other objects, features, and advantages will become more apparent from the following detailed description, which proceeds with reference to the accompanying figures.

DETAILED DESCRIPTION

I. Definitions

Figure 1:
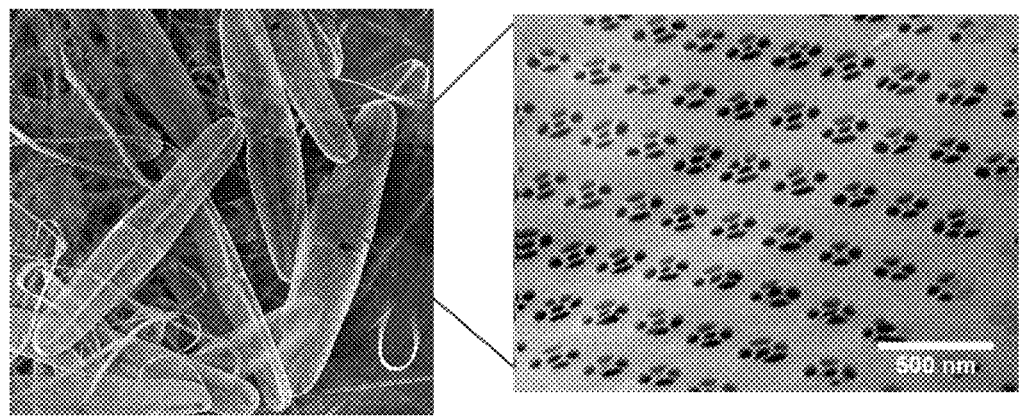
FIG. 1 is two scanning electron microscopy (SEM) images of diatom *Pinnularia* sp. shells. The second panel is a high-resolution SEM image of a diatom frustule (scale 500 nm).

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting.

Nanoparticle: A nanoscale particle with a size that is measured in nanometers, for example, a nanoscopic particle that has at least one dimension of less than about 100 nm. Examples of nanoparticles include metal nanoparticles, inorganic nanotubes, nanofibers, nanohorns, nano-onions, nanorods, nanoprisms, nanoropes and quantum dots.

Dopant: A dopant is a trace impurity inserted into a substance. In some embodiments, a dopant alters the optical and/or electrical properties of the substance. A dopant may be present in low concentrations in the substance.

Emulsion: An emulsion is a mixture of two or more liquids that are normally immiscible. Typically, one liquid is dispersed in the other liquid. Nanoparticle film: A film comprising nanoparticles. In a nanoparticle film, the nanoparticles are in direct physical contact with other nanoparticles and form a film coating on a surface.

Paint: A substance comprising a solid coloring matter suspended in a liquid that is applied to a surface and dries to form a coating. A dry powder paint is a paint that is supplied as a powder and is mixed with a solvent, typically water, before application. The mixing may occur on site, such as immediately before application.

Photocatalysis: Photocatalysis occurs when a catalyst accelerated a photoreaction. A photoctalytic nanoparticle is a nanoparticle that acts as a photocatalyst for a photoreaction, such as the degradation and/or decomposition of VOCs by light.

Polymer paint: A paint comprising a polymer, such as an acrylic or vinyl resin or binder. The polymer and water typically form an emulsion. As the water evaporates after the paint is applied to a surface, the polymer forms a film on the surface.

Stucco-like blend: A plaster or cement covering, typically for walls, that cures to a hardened state.

Suspension: A suspension is a heterogeneous mixture comprising solid particles that are sufficiently large for sedimentation, and a fluid. Typically, the solid particles are dispersed throughout the fluid by agitation, such as stirring, shaking or sonication, but will settle over time in the absence of agitation.

II. Overview

Disclosed herein is a composition comprising a diatom frustule, and two or more photocatalytic nanoparticles dispersed on a surface of the diatom frustule such that each of the two or more nanoparticles are separate and not in direct physical contact with each other, wherein a portion of the surface of the diatom frustule is free from metal or metal oxide. In some embodiments, the surface of the diatom frustule comprises an interior surface and an exterior surface, and the photocatalytic nanoparticles are uniformly dispersed on at least a portion of both the interior and exterior surfaces.

In some embodiments, the two or more nanoparticles are not connected by a metal or metal oxide film. The two or more nanoparticles may be separated from each other by an average distance of from greater than 0 nm to 100 nm, such as from 0.5 nm to 35 nm. In some embodiments, the photocatalytic nanoparticles have a size of from greater than 0 to less than 100 nm, such as from 0.5 nm to 35 nm.

The photocatalytic nanoparticles may comprise a transition metal, and may comprise titanium, iron, copper, cobalt, nickel, chromium, aluminum, gold, silver, platinum, zinc, magnesium, calcium, vanadium, tin, cerium, scandium, manganese, copper, or a combination thereof. In certain embodiments, the photocatalytic nanoparticles comprise titanium oxide nanoparticles, and may further comprise a dopant. The dopant may be a metal selected from iron, zinc, magnesium, calcium, scandium, titanium, vanadium, chromium, manganese, cobalt, nickel, copper, or a combination thereof.

In particular embodiments, the composition comprises titanium oxide nanoparticles having an average size of from 0.5 nm to 35 nm and being separated on a surface of the diatom frustule by an average distance of 0.5 nm to 35 nm. The nanoparticles may further comprise iron.

Also disclosed herein is a paint composition comprising an embodiment of the composition disclosed herein, and paint. In some embodiments, the paint is a polymer paint, and in other embodiments, the paint is a stucco-like paint. The paint may be a dry powder, or a suspension or emulsion. In some embodiments, the ratio of paint to diatom frustules is from 10:90 to 90:10 by weight, such as 60:40 paint to diatom frustules by weight. In certain embodiments, the composition comprises nanoparticles comprising titanium oxide.

A method for making the nanoparticle-decorated diatom frustules is also disclosed. In some embodiments, the method comprises mixing diatom frustules with a nanoparticle precursor at a first temperature to form a mixture, and heating the mixture at a second temperature to form nanoparticles evenly dispersed on a surface of each of the diatom frustules, wherein a portion of the surface of each of the diatom frustules is free from metal or metal oxide. Combining the diatom frustules and the nanoparticle precursor and forming the mixture, may be performed in the absence of a solvent, in the absence of a surfactant, or in the absence of both a solvent and a surfactant. In some embodiments, the mixture comprises from greater than 0 to 60% by weight diatom frustules, such as 50% by weight or 20% by weight diatom frustules.

The first temperature may be from greater than 0° C. to less than 50° C., such as from 15° C. to 35° C. The second temperature may be from 500° C. to 700° C. In some embodiments, heating the mixture comprises raising the temperature from the first temperature to the second temperature at a rate of from 10° C. per minute to 30° C. per minute, such as at about 20° C. per minute. Heating the mixture at the second temperature may comprise heating the mixture at the second temperature for about 1 hour.

In some embodiments, the nanoparticle precursor comprises titanium, iron, copper, cobalt, nickel, chromium, aluminum, gold, silver, platinum, zinc, magnesium, calcium, vanadium, tin, cerium, or a combination thereof. The nanoparticle precursor may comprise a metal alkoxide, metal chloride, metal bromide, metal iodide, metal fluoride, metal sulfate, metal nitrate, metal oxide, metal hydroxide, metal carbonate or a combination thereof. The nanoparticle precursor may comprise titanium butoxide, $FeCl_3$, $Fe_2(SO_4)_3$, $Fe(NO_3)_3$, $TiCl_4$, $ZnCl_2$, $ZnSO_4$, $MgSO_4$, $CaCl_2$, or a combination thereof, and in certain embodiments, the nanoparticle precursor comprises titanium butoxide.

The method may further comprise adding a dopant precursor to the mixture prior to heating at the second temperature. The dopant precursor may comprise iron, zinc, magnesium, calcium, scandium, titanium, vanadium, chromium, manganese, cobalt, nickel, copper, or a combination thereof. In some embodiments, the dopant precursor comprises $FeCl_3$, $Fe_2(SO_4)_3$, $Fe(NO_3)_3$, $ZnCl_2$, $ZnSO_4$, $MgSO_4$, $CaCl_2$, or a combination thereof. In certain embodiments, the nanoparticle comprises titanium oxide doped with iron. The dopant precursor may be dissolved in a solvent, such as a protic solvent. The solvent may be an alcohol, and may have a formula $CH_3OH$, $C_2H_5OH$, $C_3H_7OH$, $C_4H_9OH$, $C_5H_{11}OH$, or a mixture of two or more thereof. In some embodiments, the alcohol is ethanol, methanol, 1-propanol, 2-propanol, n-butanol, sec-butanol, iso-butanol, tert-butanol, 1-pentanol, 2-pentanol, 3-pentanol or a combination thereof.

Also disclosed herein are embodiments of a method comprising exposing the composition of any one of claims 1-14 to a volatile organic compound, and exposing the composition to visible light, UV light or both visible and UV light. The visible light, UV light or both visible and UV light may comprise sunlight and/or may comprise artificial light.

The volatile organic compound may be a component of air, and in some embodiments, exposing the composition comprises exposing the composition to a stream of air comprising the volatile organic compound. In other embodiments, exposing the composition comprises exposing the composition to a stream of water comprising the volatile organic compound. Exposing the composition may comprise applying the composition to a surface. The surface may be an interior or exterior wall.

III. Particle Decorated Diatom Frustules

Diatom frustules include various shells derived from species of diatoms. FIG. 1 shows an SEM image of diatom *Pinnularia* sp. shells and a high-resolution SEM image of the frustule. Diatom-derived intricate silica shells with periodic submicron pore arrays are reproducible through a genetically controlled bottom-up bio-mineralization of silica. The porosity of diatom frustules is more than 90% and the surface area per gram is 20-200 $m^2/g$, more preferably around 65 m²/g. The 90% porosity refers to a bulk porosity of the entire hollow shell. The ordered geometries and the arrays of submicron pores on the surface of the diatom shells enable the frustules to act as photonic crystals manipulating light in the visible range. For example, for diatom *Pinnularia* sp., the ultrahigh surface area and the nano-scale pore array results in the silica shells having strong chemical activity due to the abundance of —OH groups on the surface of the shells. In general, the range of shell thickness is between 5-500 nm, preferably about 50 nm, depending on what kind of diatom, and the range of diameter of the frustule shells is 2-500 micrometers. Pore sizes generally range from 2-1000 nm.

Diatom species suitable for use in the disclosed embodiments include any diatom species where photocatalytic nanoparticles can be attached and/or grown on to the diatom frustule. Examples of suitable diatom species include Pennate diatoms with and without a raphe; Centric diatoms; Class Coscinodiscophyceae or Sub-Class Coscinodiscophycidae Round and R. M. Crawford; Class Fragilariophyceae or Sub-Class Fragilariophycidae F. E. Round; and Class Bacillariophyceae or Sub-Class Bacillariophycidae D. G. Mann. Both single strain and mixtures of multiple strains of diatom frustules are suitable for the disclosed embodiments. Diatom earth can be used as well for embodiments of the paint compositions, as well as the described methods. In some embodiments, single strain diatom frustules are used for quantifying the properties of the paint materials. In other embodiments, products comprising single or multiple strains are used to provide different properties.

Certain embodiments of the disclosed composition comprise a diatom frustule with at least two nanoparticles on the surface(s) of the frustule, where the at least two nanoparticles are not in contact with each other. In some embodiments, the diatoms may be in the form of diatomaceous earth. The nanoparticles may be substantially uniformly or evenly dispersed on the surface of the frustule. That is, in some embodiments, each nanoparticle is separate from, and not in direct physical contact with, another nanoparticle (though it is acknowledged that there is indirect, secondary contact by way of the first nanoparticle-to-frustule and same frustule-to-second nanoparticle pathway). In some embodiments, an average distance between the nanoparticles is from greater than 0 nm to at least 100 nm, such as from 0.1 nm to 50 nm, from 0.25 nm to 35 nm, from 0.5 nm to 35 nm, from 0.5 nm to 30 nm, from 1 nm to 20 nm, or from 5 nm to 10 nm. In some embodiments, the nanoparticles do not form a film coating; nor is there a continuous and/or cracked film coating, such as a nanoparticle film, comprising a metal or metal oxide connecting some or all of the nanoparticles. In some embodiments, less than 10% of the nanoparticles are connected by a metal or metal oxide film, such as less than 5%, less than 2%, less than 1% or less than 0.5%.

In some embodiments, the nanoparticles have a substantially uniform size. The length of the longest dimension may be from greater than 0 nm to 100 nm, such as from 0.25 nm to 50 nm, from 0.5 nm to 35 nm, from 0.5 nm to 30 nm, from 0.5 nm to 10 nm, or from 3 nm to 8 nm. In some embodiments, the nanoparticles do not aggregate to form clusters or aggregates of nanoparticles.

In some embodiments, the nanoparticles are photocatalytic nanoparticles. The nanoparticles may comprise a metal. The metal may be any metal suitable to form a nanoparticle with photocatalytic activity. The metal may be a transition metal, an alkali metal, an alkaline earth metal, or a combination thereof. In some embodiments, the metal is a transition metal. In other embodiments, the metal may be titanium, iron, copper, cobalt, nickel, chromium, aluminum, gold, silver, platinum, zinc, magnesium, calcium, vanadium, tin, cerium, scandium, manganese, copper, or a combination thereof. In certain embodiments, the metal is titanium, or titanium and iron. In some embodiments, the nanoparticle comprises metal oxides, including, but not limited to, titanium oxide, iron oxide, iron/titanium oxide or a combination thereof.

In some embodiments, the composition comprises more than one type of nanoparticle, such as 2, 3, 4, 5 or 6 different types of nanoparticles. The types of nanoparticle may have different compositions, sizes, shapes, distributions, or a combination thereof. In some embodiments, the composition comprises titanium oxide nanoparticles, iron oxide nanoparticles, iron/titanium oxide nanoparticles or any combination thereof.

IV. Methods for Making Particle Decorated Diatom Frustules

Also disclosed herein are methods for making the disclosed composition. A general method comprises contacting a diatom frustule with a precursor, such as a metal-containing precursor, and forming nanoparticles on the surface of the frustule. The precursor may be any compound or mixture of compounds that reacts with the frustule to form the desired nanoparticles on the surface, such as a metal oxide nanoparticle. In some embodiments, the precursor is a halide, such as a chloride, bromide, iodide or fluoride; an alkoxide, such as a methoxide, ethoxide, propoxide, butoxide or pentoxide; a nitrate; a sulfate; an oxide; a hydroxide; a carbonate; or any combination thereof. In other embodiments, the precursor may comprise titanium, iron, copper, cobalt, nickel, chromium, aluminum, gold, silver, platinum, zinc, magnesium, calcium, vanadium, tin, cerium, scandium, manganese, copper, or a combination thereof. In certain embodiments, the metal precursor comprises $Ti^{4+}$, $Fe^{3+}$, $Fe^{2+}$, $Cu^{2+}$, $Zn^{2+}$, $Co^{2+}$, $Co^{3+}$, $Ni^{3+}$, $Mg^{2+}$, $Cr^{3+}$, $Mn^{4+}$, $Al^{3+}$, Au complexes, Pt complexes, Ag complexes, or a combination thereof.

In some embodiments, the method comprises mixing the diatoms with the precursor. The mixing may be done in the presence of a solvent or in the absence of a solvent. In certain embodiment, the method is performed in the absence of a surfactant. The mixing is performed at a first temperature suitable for the nanoparticles to start forming on the surface of the frustule. In some embodiments, the first temperature is from 20° C. to 100° C., such as from 20° C. to 50° C., or from 20° C. to 30° C. In certain embodiments, the mixing is performed without any external heating or cooling, such as at room or ambient temperature. The mixture of the frustules and the precursor is mixed, such as by stirring, shaking, sonication or a mixture thereof, for a time period sufficient for nanoparticle formation to initiate. The time period may be from one minute or less to four hours or more, such as from 5 minutes to 4 hours, from 10 minutes to 60 minutes or from 10 minutes to 30 minutes. In certain embodiments, the mixing is performed for 20 minutes.

In some embodiments, the mixing is performed in the presence of a solvent. Suitable solvents include any solvent that facilitates the formation of the nanoparticles on the diatom surface. In some embodiments, the solvent is acetone or an alcohol, such as me thanol, ethanol, 1-propanol, 2-propanol, n-butanol, sec-butanol, iso-butanol, tert-butanol, 1-pentanol, 2-pentanol, 3-pentanol or a combination thereof. In some embodiments, the solvent is a solvent mixture, and may be a dual solvent mixture. The dual solvent mixture may comprise water as one solvent. Exemplary dual solvent systems may include 1-25% water and 75-99% of one or more non-aqueous solvent, such as acetone, me thanol or ethanol. In certain embodiments, the dual solvent system is 5% water/95% me thanol, 2% water, 98% ethanol, or 1% water, 99% ethanol. In some embodiments, the weight of diatom frustules used is substantially numerically equal to the volume of solvent, for example, 50 g of diatom frustules and 50 mL of solvent.

In some embodiments, the mixing is performed in the presence of a surfactant. Suitable surfactants may include any surfactant that facilitates the formation of the nanoparticles on the diatom surface. Suitable surfactants include, but are not limited to, sodium dodecyl (ester) sulfate, lauryl mono-ethanol, sodium laureth sulfate, oleic acid, oleylamine, ethylenediamine, hexamethylene tetramine, thio glycolic acid, Tween-80, polyvinylpyrrolidone, sodium laurylsulfonate (SDS), peregals, sodium di(ethyl-2-hexyl) sulfosuccinate or combinations thereof. In some embodiments, 0.01-1% (by weight) surfactant is used.

Figure 2:
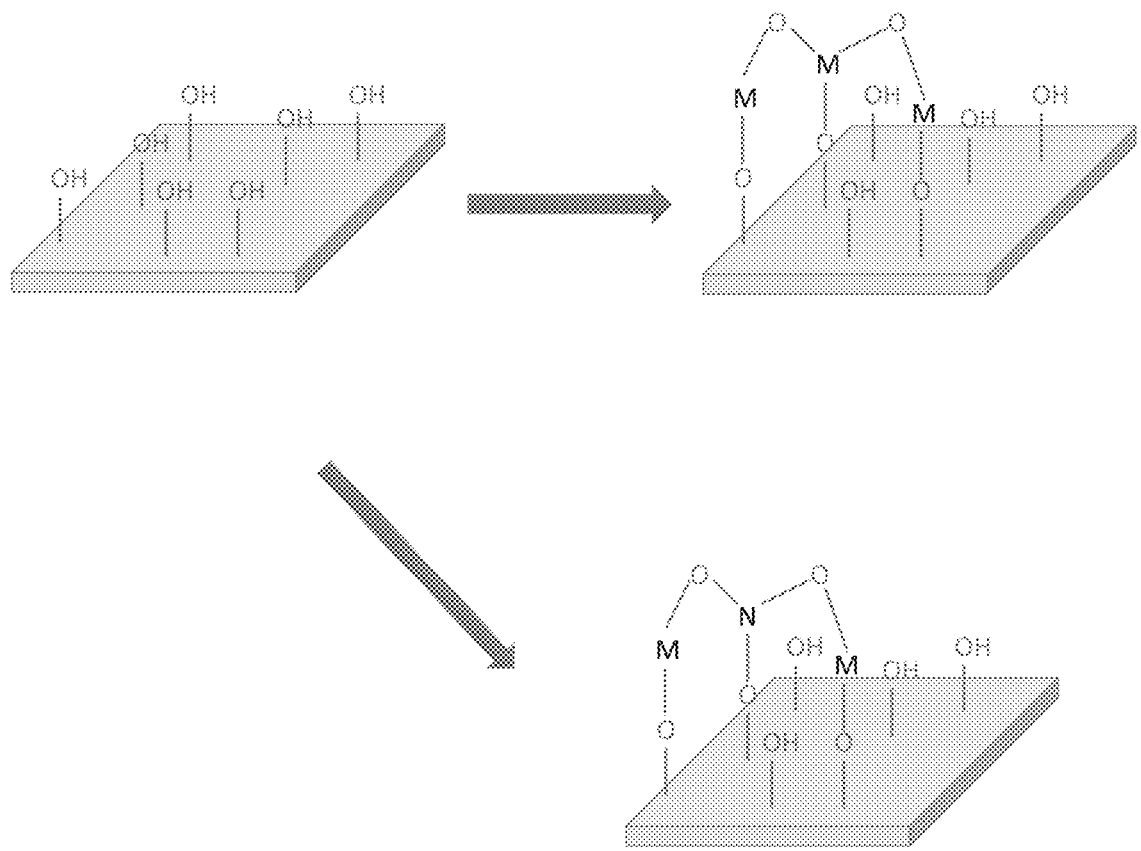
FIG. 2 is a schematic diagram illustrating how the nanoparticles form on the diatom frustule surface with and without a dopant, N.
Figure 3:
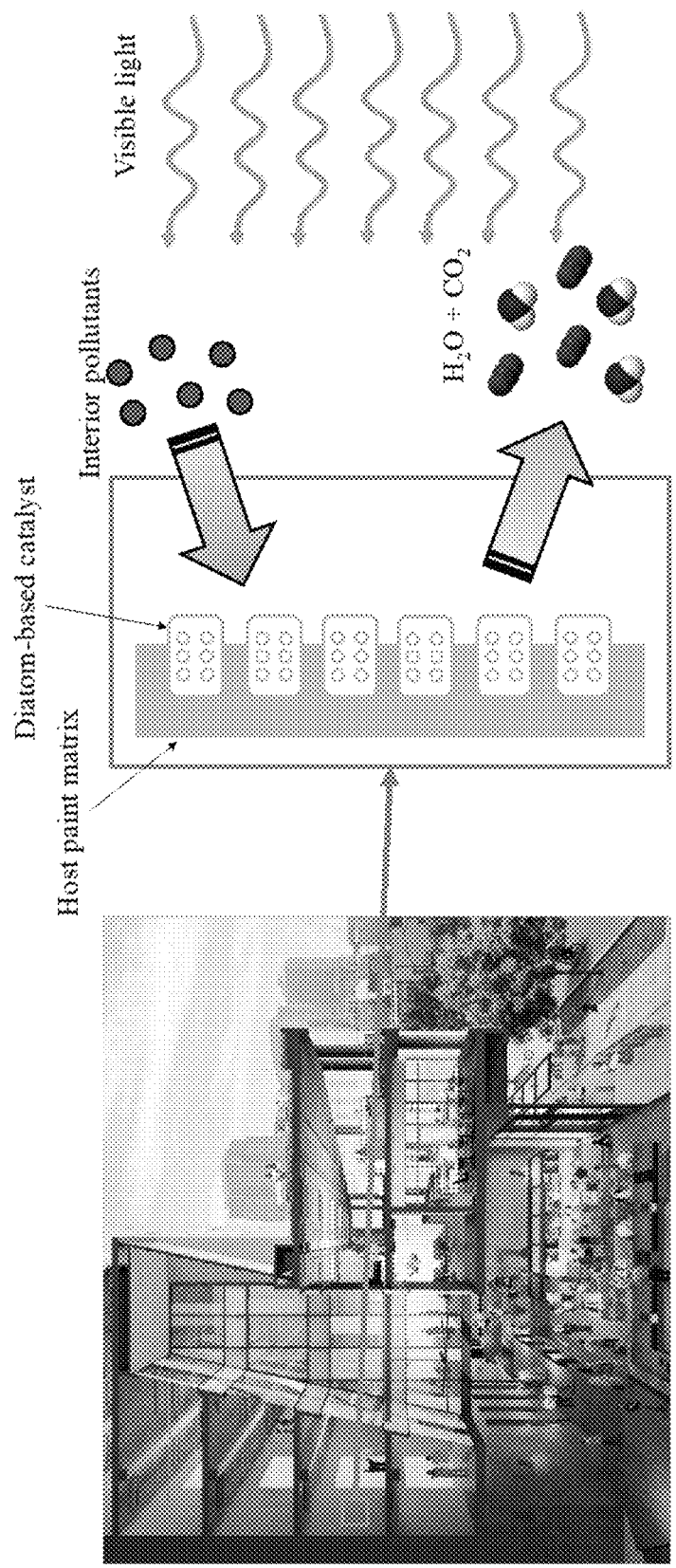
FIG. 3 is a schematic drawing illustrating how the disclosed nanoparticle compositions may be used to remove and/or degrade volatile organic compounds (VOCs) from the air.
Figure 4:
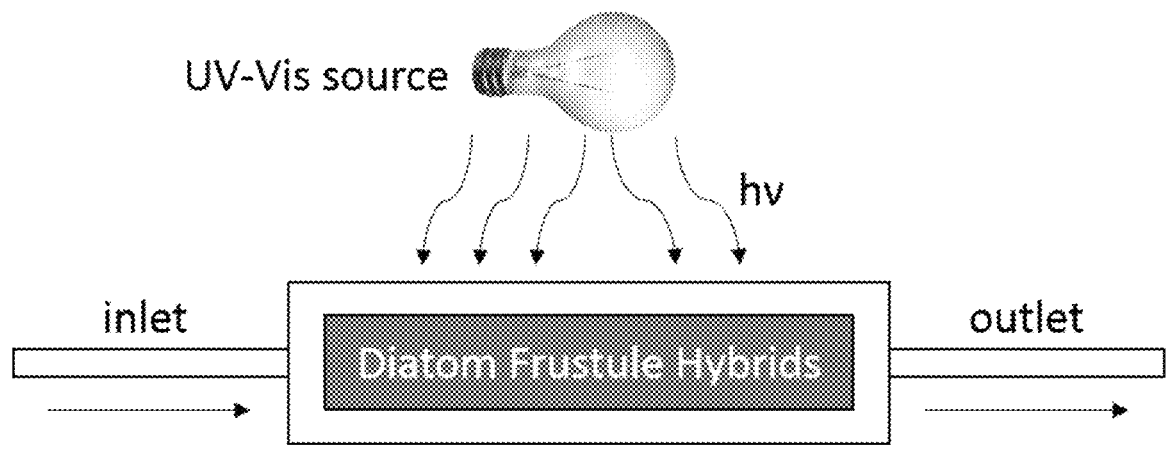
FIG. 4 is a schematic diagram illustrating how photocatalytic nanoparticle-decorated high porous diatom frustules are loaded into a catalyst vessel where water is either continuously fed or batch filtered, thereby removing both particles (utilizing nano-porous structure of diatom frustules) and organic contaminants (utilizing decorated photocatalyst materials).
Figure 5:
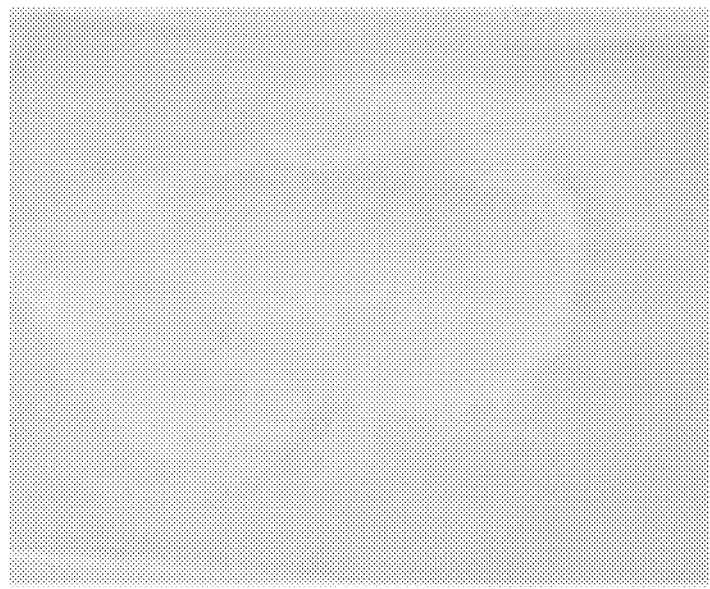
FIG. 5 is a photograph of exemplary disclosed photocatalytic titanium oxide nanoparticle-decorated diatom frustules.
Figure 6:
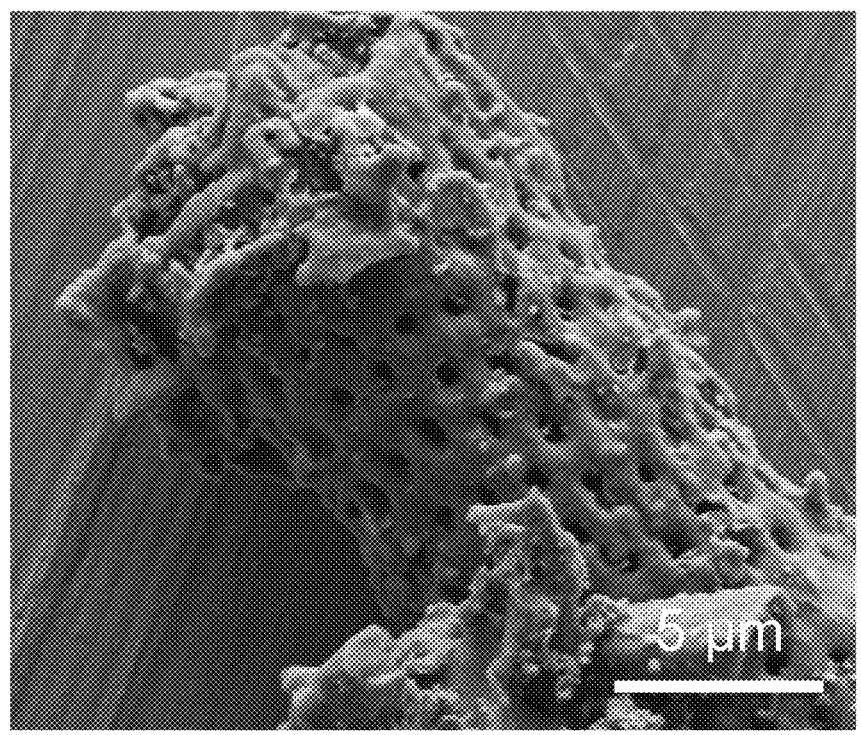
FIG. 6 is an SEM image of a photocatalytic nanoparticle-decorated diatom frustule. Scale bar: 5 μm.
Figure 7:
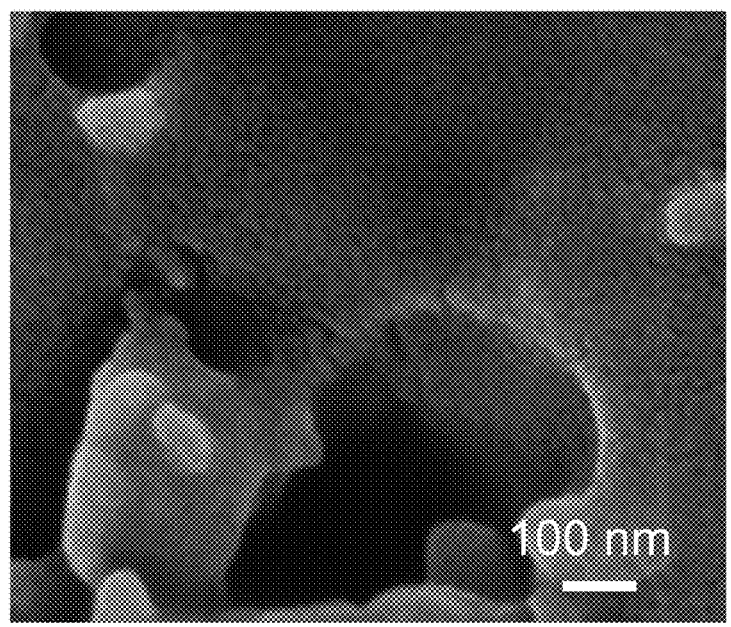
FIG. 7 is a high resolution SEM image of ultrafine (<10 nm) photocatalytic titanium oxide nanoparticles distributed substantially evenly on the diatom frustule. Scale bar: 100 nm.
Figure 8:
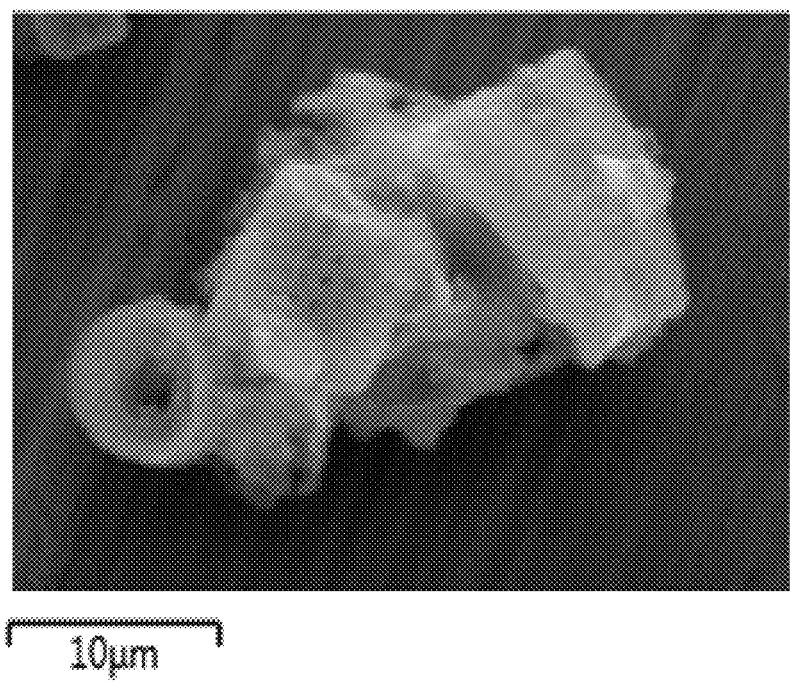
FIG. 8 is an SEM image of exemplary photocatalytic titanium oxide nanoparticle-decorated diatom frustules. Scale bar: 10 μm.

In some embodiments, the method comprises adding a dopant precursor to the mixture. The dopant may be added before, during or after mixing. The dopant precursor comprises a metal or metals that are desired as a dopant in the nanoparticle. Typically, the dopant precursor comprises at least one metal that is different from the metal or metals present in the nanoparticle precursor. In some embodiments, the dopant precursor and nanoparticle precursor comprise different metals. The dopant precursor may comprise iron, zinc, magnesium, calcium, scandium, titanium, vanadium, chromium, manganese, cobalt, nickel, copper or a combination thereof. In some embodiments, the dopant precursor is a metal salt and may be a halide, such as a fluoride, chloride, bromide or iodide, sulfate, nitrate, oxide, alkoxide, hydroxide, carbonate or combination thereof. In certain embodiments, the dopant precursor comprises $FeCl_3$, $Fe_2(SO_4)_3$, $Fe(NO_3)_3$, $ZnCl_2$, $ZnSO_4$, $MgSO_4$, $CaCl_2$, or a combination thereof. FIG. 2 shows a schematic diagram illustrating how the nanoparticles form on the diatom frustule surface with and without a dopant. With reference to FIG. 2, M is the nanoparticle material, for example titanium in certain disclosed embodiments, and N is a dopant metal, for example, iron in certain disclosed embodiments.

The dopant precursor may be added to the mixture in the absence of a solvent, or the dopant precursor may be mixed with a solvent, such as to form a slurry, suspension or solution, prior to adding to the mixture. In certain embodiments, the dopant precursor is dissolved in a solvent prior to mixing with the mixture. In some embodiments, the solvent comprises a protic solvent. The solvent may be an anhydrous solvent, or is may not be an anhydrous solvent. The solvent may comprise an alcohol, such as an alcohol having a formula $CH_3OH$, $C_2H_5OH$, $C_3H_7OH$, $C_4H_9OH$, $C_5H_{11}OH$, or the solvent may comprise two or more alcohols. In some embodiments, the solvent is me thanol, ethanol, 1-propanol, 2-propanol, n-butanol, sec-butanol, iso-butanol, tert-butanol, 1-pentanol, 2-pentanol, 3-pentanol or a combination thereof. The solvent may include 0.1-25% water, such as 0.1% to 5% water, 0.1% to 2% water, or 05% to 1% water. A person of ordinary skill in the art will understand that a reagent grade solvent, such as reagent grade ethanol, may not be an anhydrous solvent, and may therefore contain a small amount of water. For example, ACS reagent grade ethanol may have up to 0.2% water. Other reagent grade solvents may comprise different amounts of water. In some embodiments, a non-anhydrous solvent is used. In other embodiments, water is added to a solvent to form a solvent with a particular amount of water.

After the addition of a dopant precursor, the mixture may be mixed for an additional period of time. The additional period of time may be from one minute or less to four hours or more, such as from 1 minute to 4 hours, from 5 minutes to 60 minutes or from 10 minutes to 30 minutes. In certain embodiments, the mixing is performed for 20 minutes.

After mixing, the mixture is heated at a second temperature suitable to anneal the nanoparticles to the frustule. In some embodiments, the second temperature is from greater than 20° C. to 800° C. or more, such as from 100° C. to 800° C., from 250° C. to 700° C. or from 400° C. to 650° C. In certain embodiments, the second temperature is from 500° C. to 600° C. The frustules are heated at the second temperature for a time period suitable to anneal the nanoparticles. The time period may be from 1 minute to 12 hours or more, such as from 5 minutes to 6 hours or from 30 minutes to 3 hours, and in certain embodiments, the time period is 1 hour. In some embodiments, the time period does not include the time taken to raise the temperature to the second temperature. In some embodiments, the frustules are heated to the second temperature at a rate of heating of from 1° C. per minute to 60° C. or more per minute, such as from 5° C. per minute to 30° C. per minutes or from 15° C. per minute to 25° C. per minute. In some embodiments, the mixture is mixed during heating.

The process may be repeated multiple times in order to grow hybrid photocatalytic nanoparticles onto diatom frustules. For example, after deposition of iron oxide nanoparticles onto diatom frustules, titanium oxide nanoparticles are grown on the composition by repeating the process with precursors containing titanium. The metal oxide nanoparticles may be further modified with another kind of metal oxide, for example, titanium oxide-decorated frustules modified with iron oxide, or iron oxide-decorated frustules are coated with titanium. This enables embodiments of the composition to be made with band tunable photocatalysts. Exemplary embodiments include, but are not limited to, iron oxide/titanium oxide hybrids such as $Fe_2O_3/TiO_2$ hybrids.

V. Applications of Particle Decorated Diatom Frustules and Related Compositions Diatom frustules modified with photocatalytic nanoparticles offer unique physicochemical properties and number of advanced environmentally beneficial functions, superior to either photocatalytic particles or diatom frustules.

The disclosed nanoparticle-decorated diatom frustules are useful for removing and/or degrading volatile organic compounds (VOCs) for air and water purification. Additionally, the disclosed compositions may also be used to remove particulate matter from the air and/or water. The disclosed compositions may be used directly, such as to purify water, chemical waste, and/or waste streams, or added to other compositions, including, but not limited to, surface coatings such as paint, cement or concrete, hardwood, laminate, tile, stone, polymer material, or combinations thereof, for example, to remove VOCs from air. Upon exposure to VOCs and visible, UV or both visible and UV light, the photocatalytic nanoparticle-decorated diatom frustules degrade the VOCs to non-toxic gases. In some embodiments, the rate of degradation of the VOCs depends on the amount of light the nanoparticles are exposed to. In embodiments where the amount of light is low, the rate of degradation is slow; when there is plenty of light, such as in sunlight or exposure to bright lamps, the rate of degradation increases. The light may be natural light, such as sunlight, or artificial light, or a combination of natural and artificial light.

Diatom frustules possess a large mechanical strength that is used for protecting the biological materials within the organism. This enhanced mechanical strength of the frustule is retained after the lifetime of the diatom and harnessed for creating robust coating additives for coating such as paint, varnish, acrylics, PVA glue, or any polymer coating. The disclosed nanoparticle-decorated diatom frustules are added to paint, such as inorganic pigments, polymer paint, non-polymer-containing paint, or stucco-like blends. Typically, the paint is an architectural paint, and may be an exterior paint, an interior paint, or a paint for use on both exterior and interior walls. The paint maybe a gloss or hi-gloss, semi-gloss, flat or matte, satin, egg-shell, flat enamel or low-sheen paint. The decoration of diatom frustules with photocatalytic nanoparticles (having different refractive index, compared to diatom frustules only) enables diatom frustules to selectively backscatter light.

Figure 9:
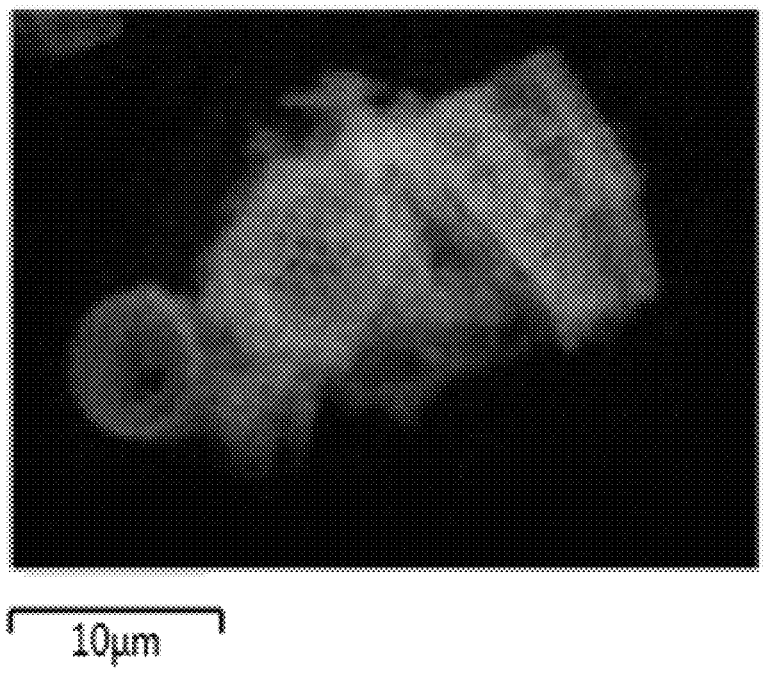
FIG. 9 is an energy-dispersive X-ray spectroscopy (EDX) image of the diatom frustules from FIG. 8, illustrating the locations of silica in the diatom frustules. Scale bar: 10 μm.
Figure 10:
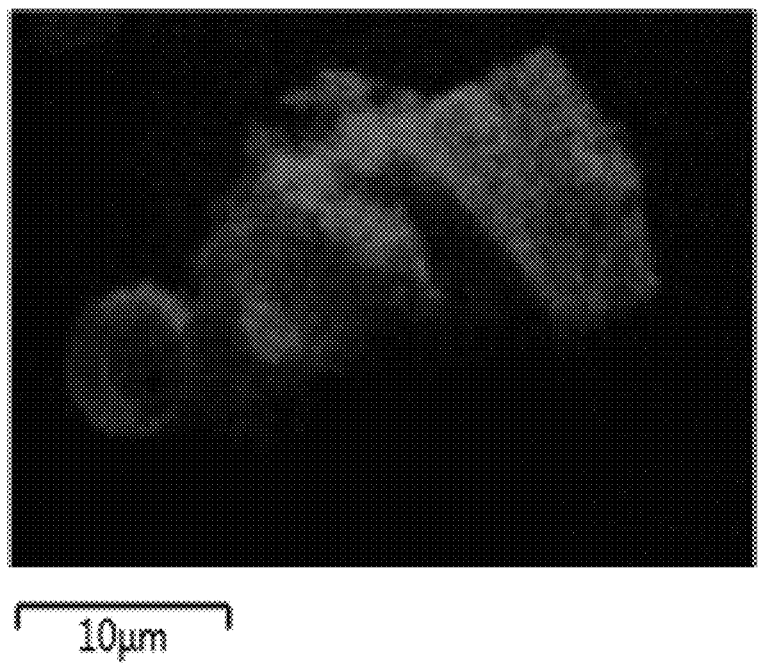
FIG. 10 is an EDX image of the diatom frustules from FIG. 8, illustrating the locations of oxygen in the diatom frustules. Scale bar: 10 μm.
Figure 11:
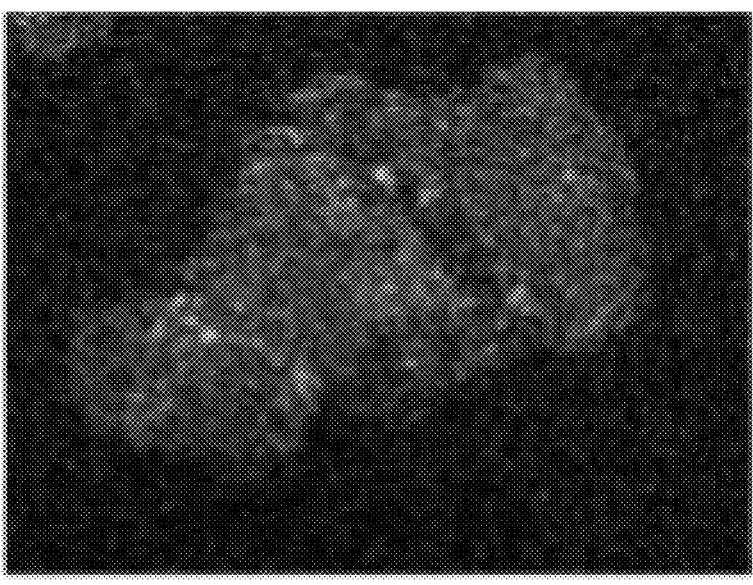
FIG. 11 is an EDX image of the diatom frustules from FIG. 8, illustrating the locations of titanium in the diatom frustules. Scale bar: 10 μm.
Figure 12:
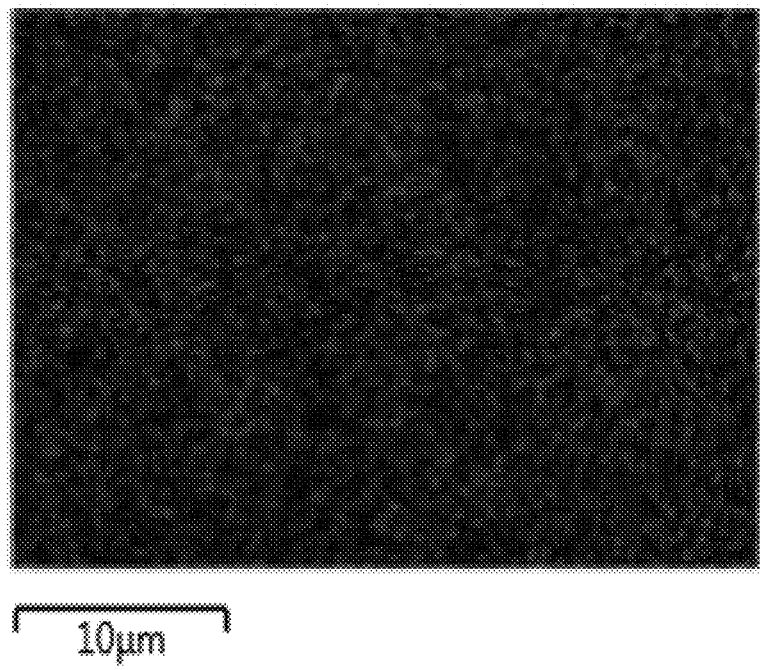
FIG. 12 is an EDX image of the diatom frustules from FIG. 8, illustrating the lack of iron in the diatom frustules. Scale bar: 10 μm.

To gain access to air or air with pollutant, photocatalytic nanoparticle-decorated diatom frustules may be placed on top layer of coating. Photocatalytic nanoparticle-decorated diatom frustules can be placed on top layer of latex or other polymer coatings. This process produces a self-cleaning and antibacterial painted surface for improving indoor air quality through continuous decontamination of VOCs (FIG. 3). The top layer coating method can varying from spray painting, aerosols, ultrasonic spray coating, brush painting, dip coating, spin coating, and drip coating along with similar methods.

Photocatalytic nanoparticle-decorated diatom frustules can be an additive added to paint products before sale, or alternatively directly applied by a customer to customize his or her own paint materials. After decoration with photocatalytic nanoparticles, the modified diatom frustules can be applied to interior surfaces as a functional coating that can purify and maintain interior environment air quality within safe levels of VOCs, NOx, buffer humidity, and may provide a matte finish, which eliminates specular reflection.

In some embodiments, the diatom frustule composition comprising the nanoparticles are added to the paint in a ratio of from 10:90 frustules:paint by weight to 90:10 frustules:paint, such as 20:80, 30:70, 40:60, 50:50, 60:40, 70:30 or 80:20.

Photocatalytic nanoparticle-decorated diatom frustules can also be applied to a material that hardens on drying or curing, such as concrete or plaster. Typically, the composition is applied before the material hardens. After hardening, photocatalytic nanoparticle-decorated diatom frustules are fixed on the surface of the material. Under sunlight or other light source, the coated photocatalytic nanoparticle-decorated diatom frustules start to absorb and degrade VOCs or other pollutants.

The composition may be applied to a movable structure. The movable structure optionally may be a free-standing structure, such as a panel with a stand or an A-frame structure, or a hanging structure, such as a wall hanging or car air freshener-style object. The movable structure may be used to remove VOCs from rooms or areas that are, or have been, decorated, such as by painting, or having new carpet. Specifically contemplated are panels that readily can be hung, for instance, in a newly painted or treated area or any enclosed or partially enclosed area, including but not limited to inside a car or other vehicle.

In other embodiments, the photocatalytic nanoparticle-decorated diatom frustules are placed in a tube-like transparent filter system. Air circulating in a building, such as by the action of an HVAC system, is directed through the filter containing the photocatalytic nanoparticle-decorated diatom frustules. Under a visible and/or UV light source, VOCs or other pollutants are captured by the filter and are degraded, for example, into $CO_2$ and $H_2O$. The diatom frustules may also act as a filter, removing particulate matter from the air. This is an example of continuous filtering in a forced-air system.

In other embodiments, the disclosed nanoparticle-decorated diatom frustules are useful for water purifying (FIG. 4). An example of a device is a porous film containing one or more layers of photocatalytic nanoparticle-decorated diatom frustules and a substrate, such as a fabric substrate. The porous film is placed in the water at a depth of 1 centimeter to 50 centimeters. Under visible and/or UV light, such as sunlight or a UV lamp, embodiments of the disclosed composition on a substrate would continuously collect and decompose organic contaminants in the water. Another example of a water purifying device is a tube-like filter into which are placed the disclosed diatom frustules. The water is then directed to run through the filter, while the filter is illuminated by a visible and/or UV light source. The diatom frustules may also act as a filter, removing particulate matter from the water.

The following examples are provided to illustrate certain particular features and/or embodiments. These examples should not be construed to limit the invention to the particular features or embodiments described.

VI. Examples

Example 1

Preparation of Diatoms

Diatoms are cultured within a photobioreactor then extracted from the liquid media suspension and purified, separating the lipids and proteins from the frustule, which is predominantly composed of silica. These frustules are then rinsed repeatedly with centrifugation and distilled water until nothing remains except the frustules.

Alternatively, or additionally, diatoms (or diatomaceous earth) are available from a variety of sources including commercial sources. Diatoms purchased from commercial suppliers may be a single species or may be a mixture of species. Both commercial diatoms and cultured diatoms may be used in the disclosed embodiments.

Example 2

Synthesis of Titanium Oxide Nanoparticle-Decorated Diatom Frustules (TIC_2)

100 gram of diatomaceous earth was mixed with 50 gram titanium butoxide in the absence of a solvent, and mechanically stirred for 20 minutes. The mixture was transferred to a ceramic bowl and heated by gradually increasing temperature from 25° C. to 600° C. (around 20° C. per minute), then the sample was annealed at 600° C. for 1 hour. After cooling down to room temperature, the resulting white powder was stored in clean glass bottle (FIG. 5). FIG. 6 shows an SEM image of an exemplary diatom frustule with titanium oxide nanoparticles on the surface. FIG. 7 shows a high resolution image of the diatom frustule, illustrating the even distribution of the nanoparticles.

FIG. 8 is an SEM image of diatom frustules with titanium oxide nanoparticles dispersed on the surface. FIGS. 9 and 10 are energy-dispersive X-ray spectroscopy (EDX) images, showing chemical elemental analysis results. FIG. 9 shows the locations of silicon on the diatom frustule surface, and FIG. 10 shows the oxygen locations. FIG. 11 shows the locations of the titanium metal in the nanoparticles. FIG. 11 clearly shows that the nanoparticles were separate from each other, and dispersed substantially evenly over the frustule surface. The nanoparticles did not form a film over the surface. FIG. 12 shows that there was no iron in these particular nanoparticles.

Example 3

Synthesis of Iron/Titanium Oxide Nanoparticle-Decorated Diatom Frustules (Product TFD)

Figure 13:
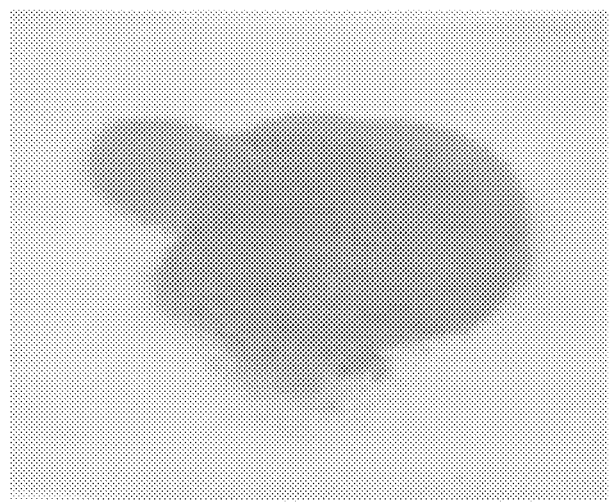
FIG. 13 is a photograph of exemplary disclosed photocatalytic iron/titanium oxide nanoparticle-decorated diatom frustules.
Figure 14:
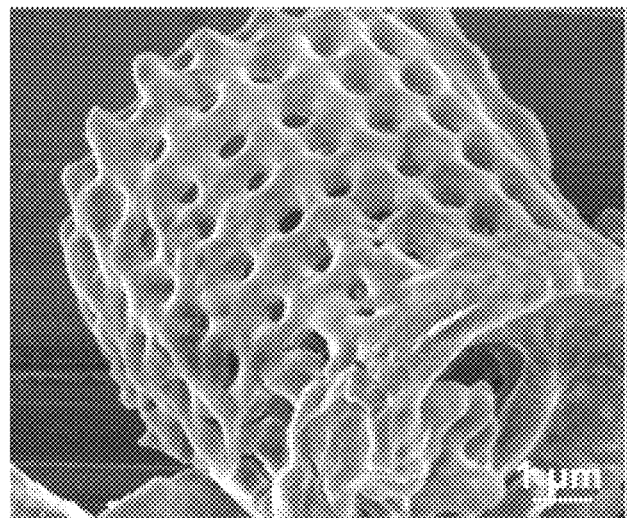
FIG. 14 is an SEM image of a photocatalytic iron/titanium oxide nanoparticle-decorated diatom frustule. Scale bar: 1 μm.
Figure 15:
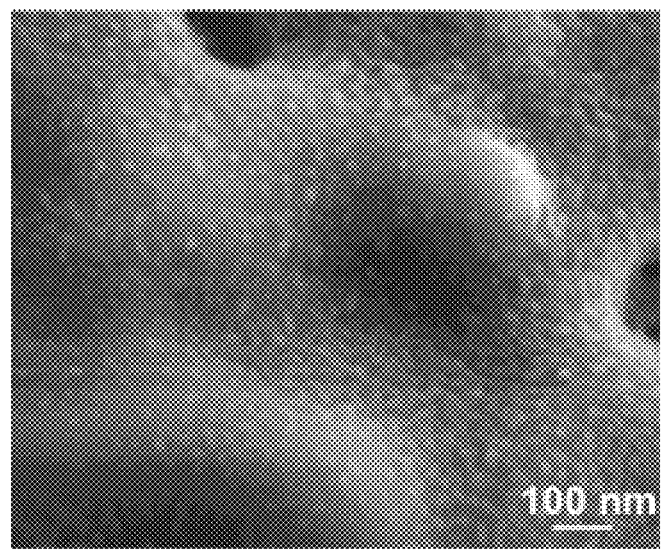
FIG. 15 is a high resolution SEM image of ultrafine (<10 nm) photocatalytic titanium oxide/iron oxide hybrid nanoparticles distributed substantially evenly on the diatom frustule. Scale bar: 100 nm.

100 grams of diatomaceous earth was mixed with 50 grams of titanium butoxide. 2.67 grams of iron chloride dissolved in 50 mL ethanol containing 2% water was added and the mixture was mechanically stirred for 20 minutes. The mixture was transferred to a ceramic bowl and heating by gradually increasing temperature from 25° C. to 600° C. (around 20° C. per minute), then the sample was annealed at 600° C. for 1 hour. After cooling down to room temperature, the resulting brown powder was stored in clean glass bottle (FIG. 13). FIG. 14 shows an SEM image of an exemplary diatom frustule with titanium oxide nanoparticles on the surface. FIG. 15 shows a high resolution image of the diatom frustule, illustrating the even distribution of the nanoparticles.

Figure 16:
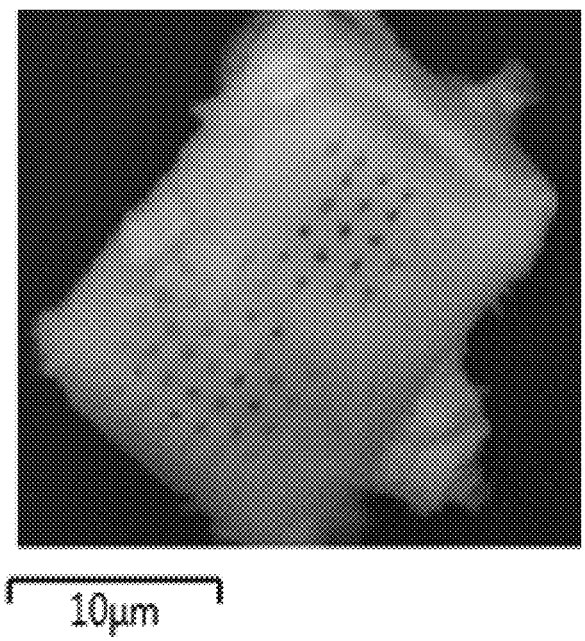
FIG. 16 is an SEM image of an exemplary photocatalytic iron/titanium oxide nanoparticle-decorated diatom frustule. Scale bar: 10 μm.
Figure 17:
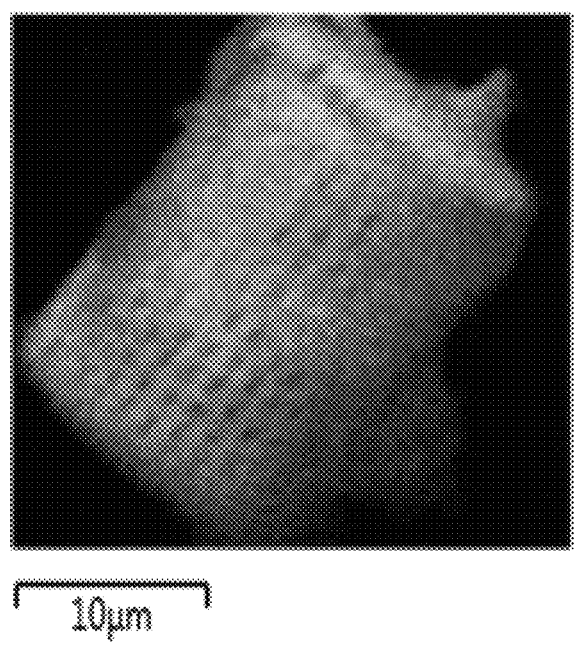
FIG. 17 is an EDX image of the diatom frustule from FIG. 16, illustrating the locations of silica in the diatom frustule. Scale bar: 10 μm.
Figure 18:
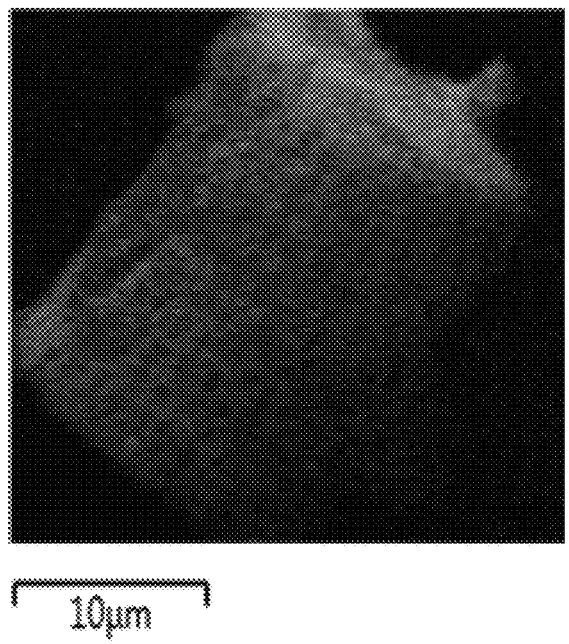
FIG. 18 is an EDX image of the diatom frustule from FIG. 16, illustrating the locations of oxygen in the diatom frustule. Scale bar: 10 μm.
Figure 19:
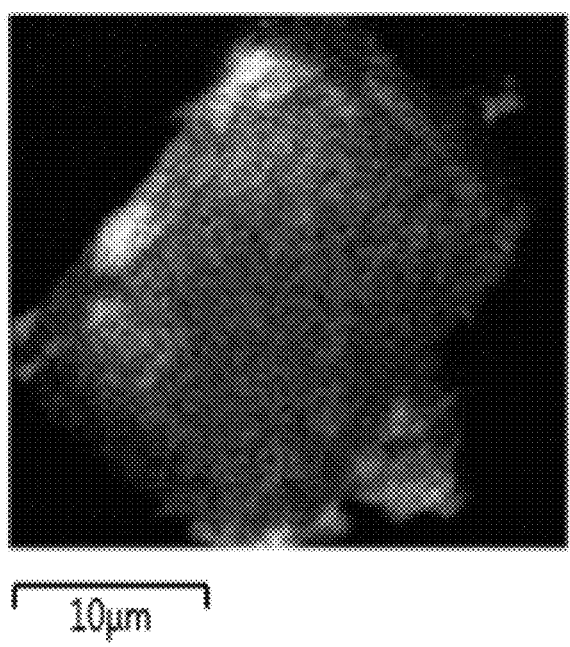
FIG. 19 is an EDX image of the diatom frustule from FIG. 16, illustrating the locations of titanium in the diatom frustule. Scale bar: 10 μm.
Figure 20:
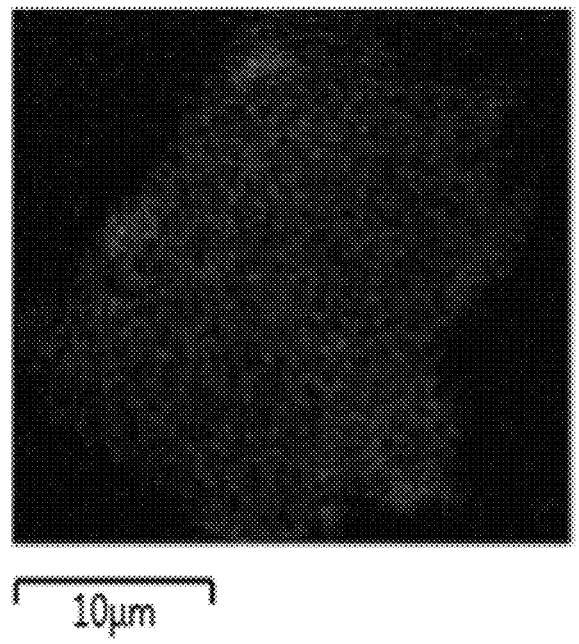
FIG. 20 is an EDX image of the diatom frustule from FIG. 16, illustrating the locations of iron in the diatom frustule. Scale bar: 10 μm.

FIG. 16 is an SEM image of diatom frustules with nanoparticles dispersed on the surface. FIGS. 17 and 18 are energy-dispersive X-ray spectroscopy (EDX) images, showing chemical elemental analysis results. FIG. 17 shows the locations of silicon on the diatom frustule surface, and FIG. 18 shows the oxygen locations. FIG. 19 shows the locations of the titanium metal in the nanoparticles. FIG. 20 clearly shows that the nanoparticles were separate from each other, and dispersed substantially evenly over the frustule surface. The nanoparticles did not form a film over the surface. FIG. 20 shows locations of the iron in the nanoparticles. Again, the iron did not form a film over the surface of the nanoparticle. Instead the iron was at discrete locations on the surface.

Example 4

Figure 21:
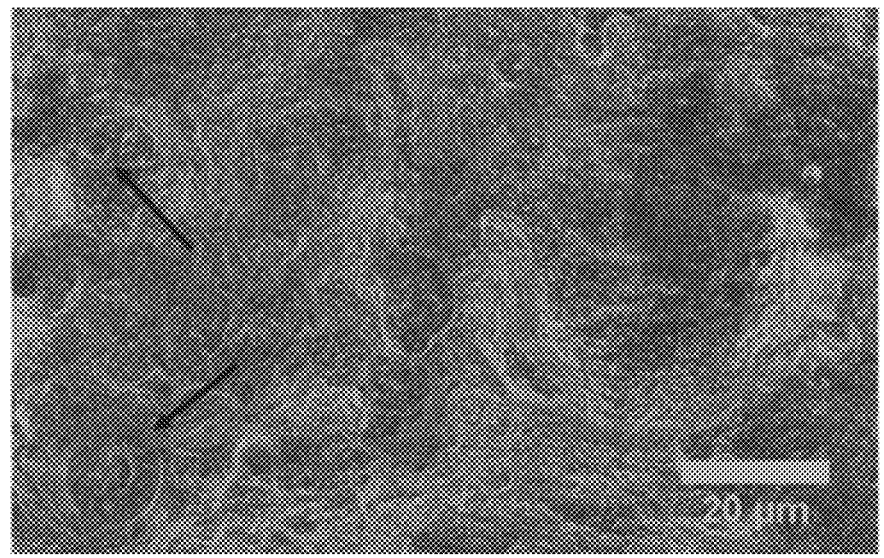
FIG. 21 is an SEM image of a polymer paint mixed with exemplary disclosed titanium oxide nanoparticle-decorated diatom frustules, with arrows indicating the locations of diatom frustules.

40 grams of titanium dioxide-decorated diatom frustules were mixed with 60 grams polymer paint, and mechanically stirred for 30 minutes. The mixed paint was then ready for use. FIG. 21 provides an SEM image of the polymer paint mix, with the arrows indicating the location of diatom frustules.

Example 5

Figure 22:
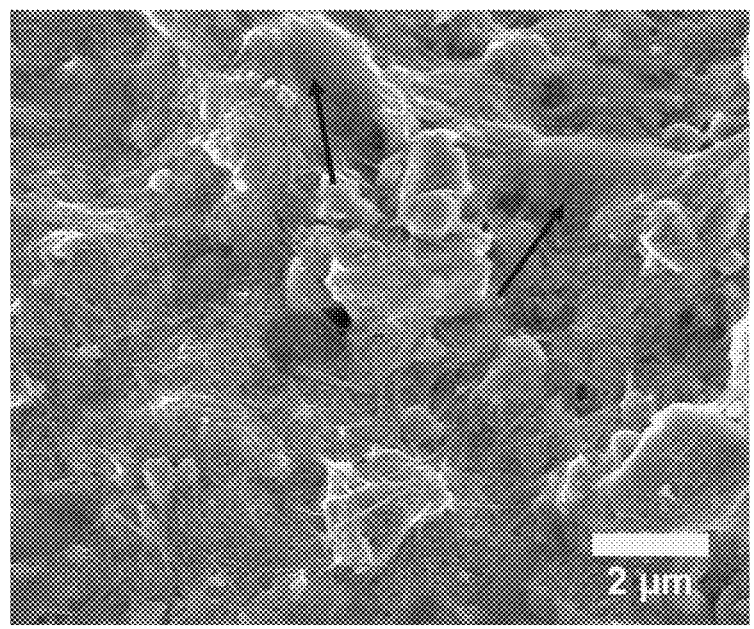
FIG. 22 is an SEM image of a stucco-like paint mixed with exemplary disclosed titanium oxide nanoparticle-decorated diatom frustules, with arrows indicating the locations of diatom frustules.

40 grams of titanium dioxide-decorated diatom frustules were mixed with 60 grams of a stucco-like blend, and mechanically stirred for 30 minutes. The mixed paint was then ready for use. FIG. 22 provides an SEM image of the stucco-like paint mix, with the arrows indicating the location of diatom frustules.

Example 6

Diatom Frustules with Iron Oxide Nanoparticles

Figure 23:
FIG. 23 shows diatom frustules loaded with different amounts of iron oxide nanoparticles, low to high from left to right.

Diatom frustules with iron oxide nanoparticles were prepared by from 50 mg frustules, 0.05 mM iron (III) chloride, 0.5 ml ethylenediamine and 2 mL oleic acid in 16 mL ethanol. The composition was heated at 180° C. for 8 hours then at 400° C. for 2 hours. By varying the amount of iron (III) chloride, photocatalytic nanoparticle-decorated diatom frustules with various colors were grown. FIG. 23 shows four hybrid structures with different colors. This process allows the color to be tuned in addition to improved photocatalytic properties for the dual functions as a pigment and catalyst within paint materials.

Example 7

Figure 24:
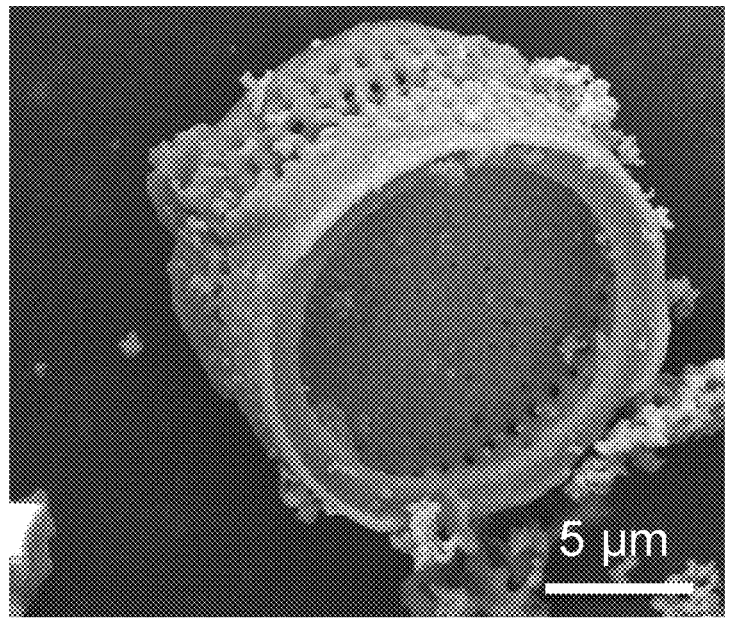
FIG. 24 is an SEM image of a photocatalytic titanium oxide nanoparticle-decorated diatom frustule. Scale bar: 5 μm.
Figure 25:
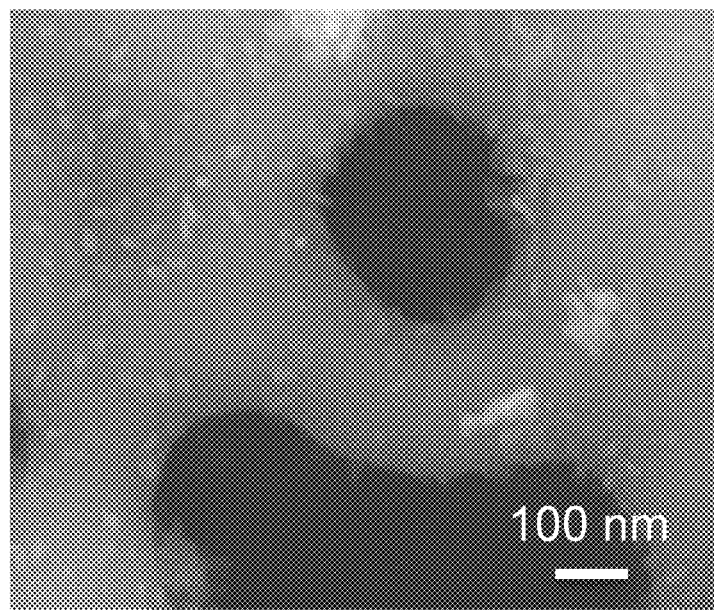
FIG. 25 is a high resolution SEM image of ultrafine (<10 nm) photocatalytic titanium oxide nanoparticles distributed on the diatom frustule from FIG. 24. Scale bar: 100 nm.

Synthesis of Titanium Oxide/Iron Oxide Nanoparticle-Decorated Diatom Frustules (Product TIC) using Titanium Butoxide and Diatomaceous Earth with Ethanol Typically, 50 gram of diatomaceous earth was mixed with 30 gram titanium butoxide, 1 mL water and 49 mL ethanol by mechanically stirring for 20 minutes; the mixture was transferred to a ceramic bowl and heating by gradually increasing temperature from 25° C. to 600° C. (around 20° C. per minute), then the sample was annealed at 600° C. for 1 hour. After cooling down around room temperature, the resulting white powder was stored in clean glass bottle. FIG. 24 shows an SEM image of an exemplary diatom frustule with titanium oxide nanoparticles on the surface prepared by this method. FIG. 25 shows a high resolution image of the diatom frustule, illustrating that the distribution of the nanoparticles was mainly even, but that there were also small clusters of nanoparticles present.

Example 8

Chemical Bath Deposition of Titanium Oxide on Diatom Frustules (Product CBD)

Figure 26:
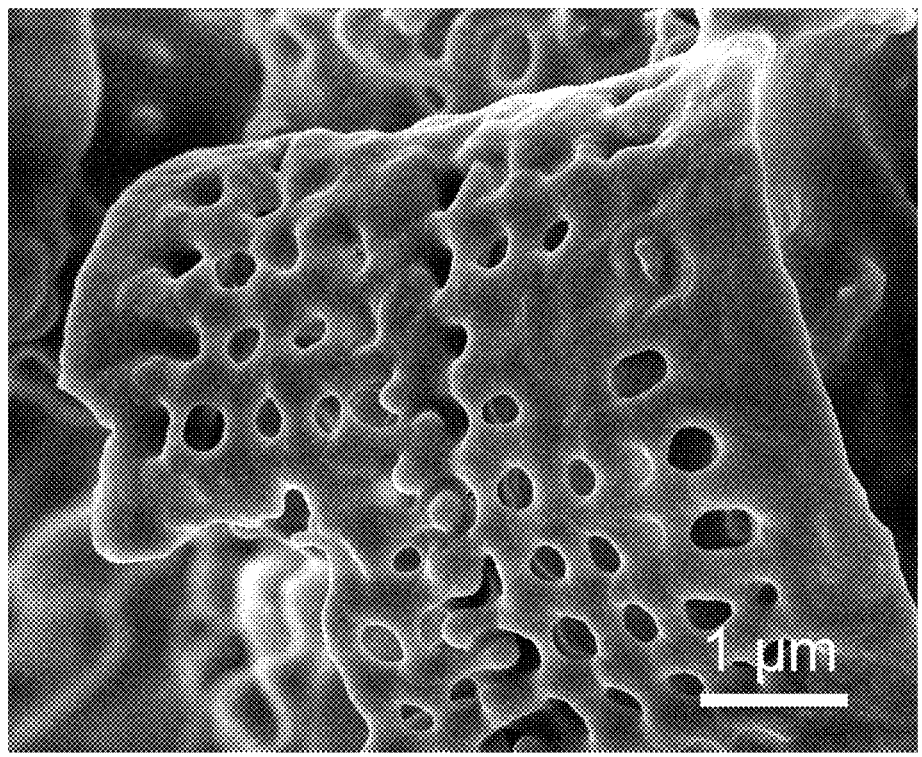
FIG. 26 is an SEM image of diatom frustules prepared by chemical bath deposition. Scale bar: 1 μm.
Figure 27:
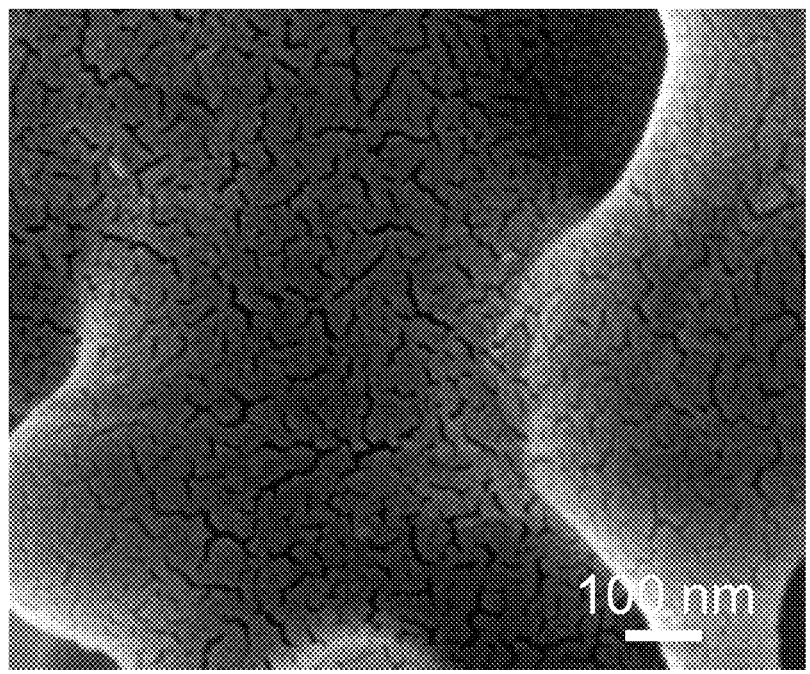
FIG. 27 is a high resolution SEM image of the diatom frustule from FIG. 26 (<10 nm) illustrating the presence of a cracked film on the surface, and the absence of discrete nanoparticles. Scale bar: 100 nm.

A modified chemical bath deposition method was used. Briefly, 25 gram of diatomaceous earth was mixed with 5 gram titanium butoxide, 2 mL water and 98 mL ethanol and mechanically stirred for 20 minutes. The mixture was heated at 90° C. for 30 minutes, the precipitates were collected and washed three times with water, then transferred to a ceramic bowl and heating by gradually increasing temperature from 25° C. to 600° C. (around 20° C. per minute), then the sample was annealed at 600° C. for 1 hour. After cooling around room temperature, the resulting white powder was stored in clean glass bottle. FIG. 26 shows an SEM image of an exemplary diatom frustule with titanium oxide nanoparticles on the surface prepared by chemical bath deposition. FIG. 27 shows a high resolution image of the diatom frustule, illustrating that the titanium oxide had formed a cracked film over the diatom frustule surface. No discrete nanoparticles were identified.

Example 9

Hydrothermal Deposition of Titanium Oxide on Diatom Frustules (Product AH_K)

Figure 28:
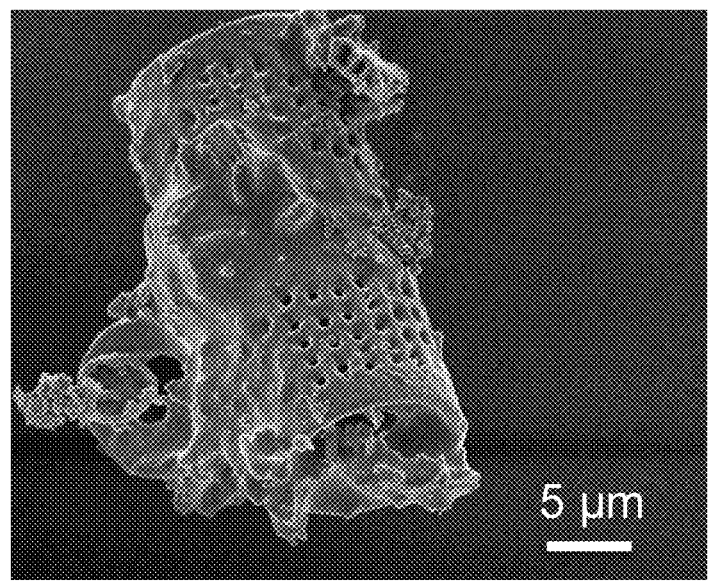
FIG. 28 is an SEM image of diatom frustules prepared by hydrothermal deposition. Scale bar: 5 μm.
Figure 29:
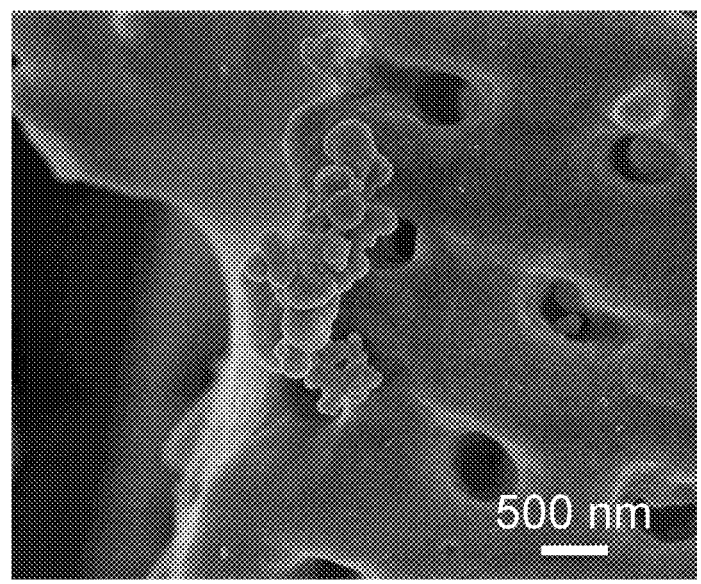
FIG. 29 is a high resolution SEM image of the diatom frustules from FIG. 28 illustrating the presence of a nanoparticle film on the surface. Scale bar: 500 nm.
Figure 30:
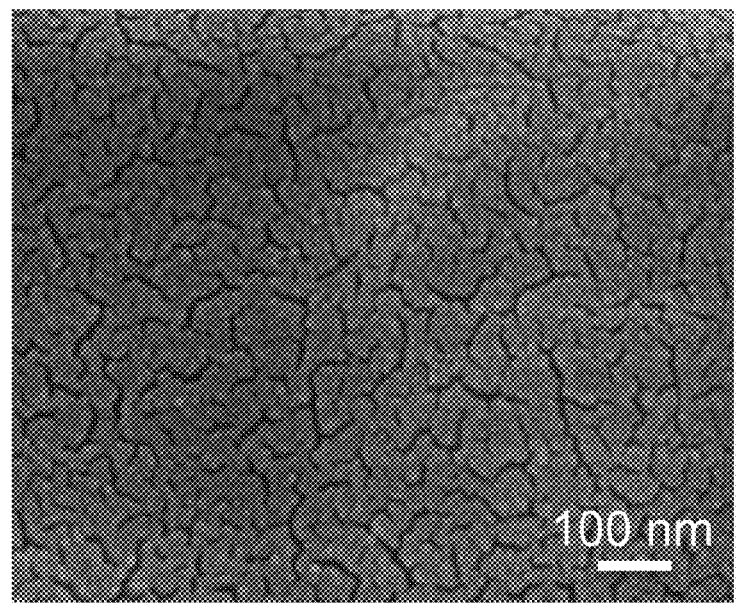
FIG. 30 is a high resolution SEM image of the surface of the diatom frustule from FIG. 29, illustrating that the film is cracked. Scale bar: 100 nm.

A modified hydrothermal method was used. Briefly, 25 gram of diatomaceous earth was mixed with 5 gram titanium butoxide, 5.6 gram KOH, and 100 mL water and mechanically stirred for 20 minutes. The mixture was heated at 90° C. for 30 minutes and then the precipitate was collected and washed five times with water. The precipitate was transferred to a ceramic bowl and heated by gradually increasing temperature from 25° C. to 600° C. (around 20° C. per minute). The sample was then annealed at 600° C. for 1 hour. After cooling down around room temperature, the resulting white powder was stored in clean glass bottle. FIG. 28 shows an SEM image of an exemplary diatom frustule with titanium oxide nanoparticles on the surface prepared by chemical bath deposition. FIG. 29 shows a high resolution image of the diatom frustule, illustrating the titanium oxide nanoparticle film on the surface of the diatom frustule. FIG. 30 shows that the titanium oxide film was cracked.

Example 10

Titanium Oxide Nanoparticle-Decorated Diatom Frustules and Iron/Titanium Oxide Nanoparticle-Decorated Diatom Frustules are Highly Efficient for VOC Degradation The EPA lists concentrations of airborne particle pollution greater than 40 µg/m$^3$ as an unhealthy level. Within 24 hours, exposures exceeding 250 µg/m$^3$ are considered hazardous. IPA (isopropyl alcohol), one of hardly decomposed chemicals, is commonly used to test VOC-removal capabilities.

Figure 31:
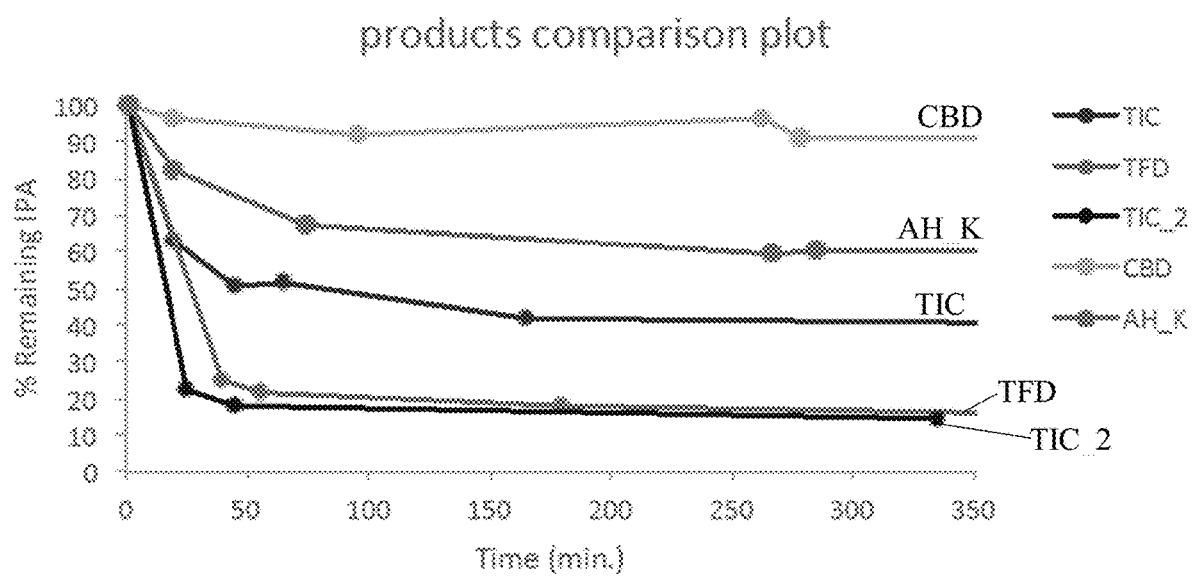
FIG. 31 is a graph of percentage of isopropyl alcohol (IPA) remaining versus time illustrating the rate of IPA removal by certain disclosed compositions, compared to the rate of IPA removal by diatom frustules coated with films of titanium oxide generated by hydrothermal and chemical bath deposition methods.

Powders were coated evenly onto the bottom of round flasks, then the flasks were sealed with a threaded cap and a Teflon/silicone septum. IPA (2-propanol) was then spiked/injected into each flask with a syringe. The flasks used ranged from 2-5 L in volume, and from 1-30 µL of IPA was added. After spiking, external lights were directed at the powder to initiate photocatalysis. At regular/planned time intervals, the gas/vapor from the flask was sampled with an SPME fiber. The fiber was then injected into a GC/MS instrument and the absorbed VOC(s) was analyzed. FIG. 31 provides the results from diatom frustules with titanium oxide-only nanoparticles (TIC and TIC_2), titanium oxide/iron oxide nanoparticles (TFD) and diatom frustules with film coatings deposited by chemical bath deposition (CBD) or hydrothermal deposition (AH_K). As can be seen in FIG. 31, both the titanium oxide nanoparticle-decorated diatom frustules TIC_2 and iron/titanium oxide nanoparticle-decorated diatom frustules TFD demonstrated more than 80% VOC-removal rate based on IPA concentration within one hour. In contrast, after over 5 hours, diatom frustules coated by hydrothermal deposition (AH_K) only reduced the amount of IPA by about 30-40% and diatoms frustules coated by chemical bath deposition (CBD) did not reduce the amount of IPA at all. These results clearly show the benefit of dispersed nanoparticles over a film coating for removing VOCs from the atmosphere. Additionally, sample TIC gave better results than the CBD and AH_K samples, but not as good as the TIC_2 or TFD samples. Without being bound to a particular theory, the difference in the results may be due to the presence of small clusters of nanoparticles on the frustule surface in the TIC sample (FIG. 25). The SEM of TIC_2 did not show any such small clusters of nanoparticles; the distribution of nanoparticles was substantially even.

Example 11

Figure 32:
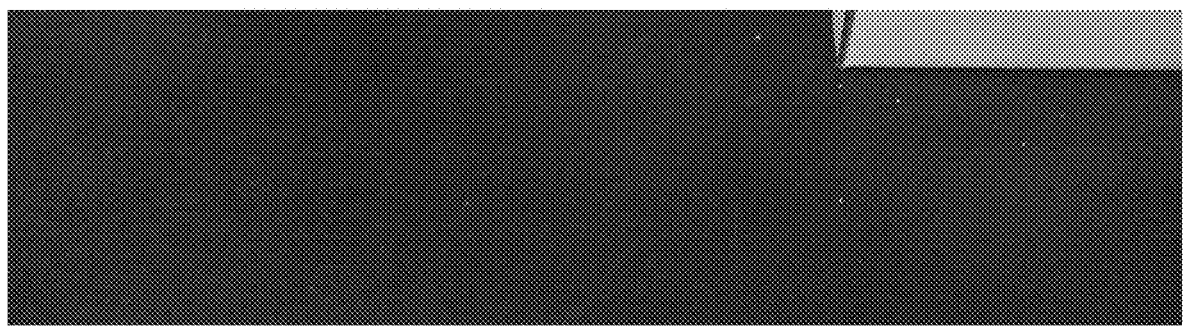
FIG. 32 is a photograph illustrating glass panels coated with new formulated paints containing polymer paints and titanium oxide nanoparticle-decorated diatom frustules.
Figure 33:
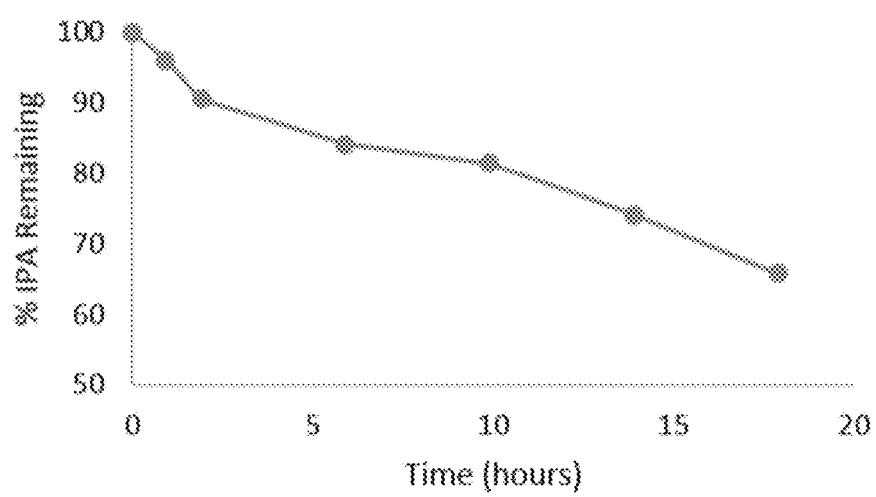
FIG. 33 is a graph of percentage of isopropyl alcohol (IPA) remaining versus time illustrating the degradation of IPA by a polymer paint comprising 40% titanium oxide nanoparticle-decorated diatom frustules.
Figure 34:
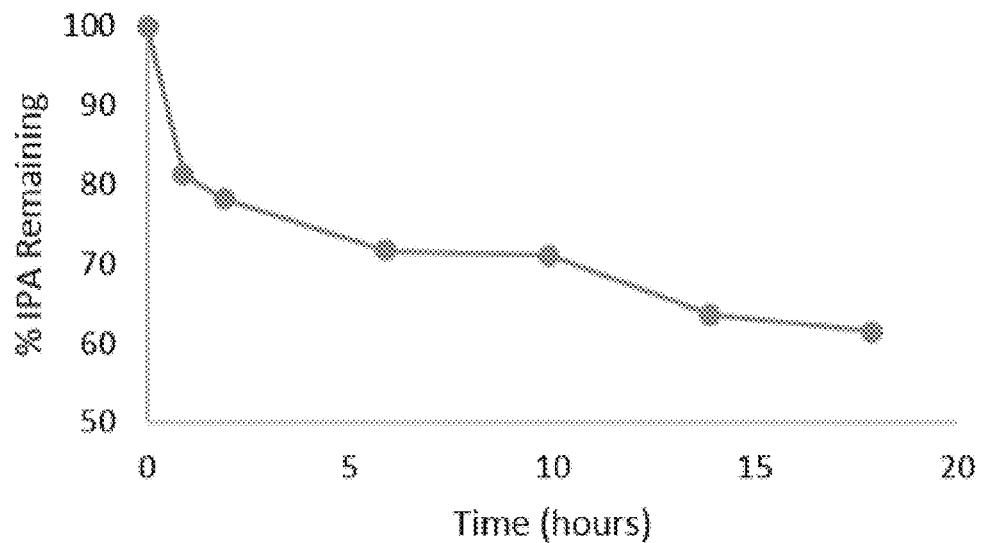
FIG. 34 is a graph of percentage of IPA remaining versus time illustrating the degradation of IPA by a stucco-like blend comprising 40% iron/titanium oxide nanoparticle-decorated diatom frustules.
Figure 35:
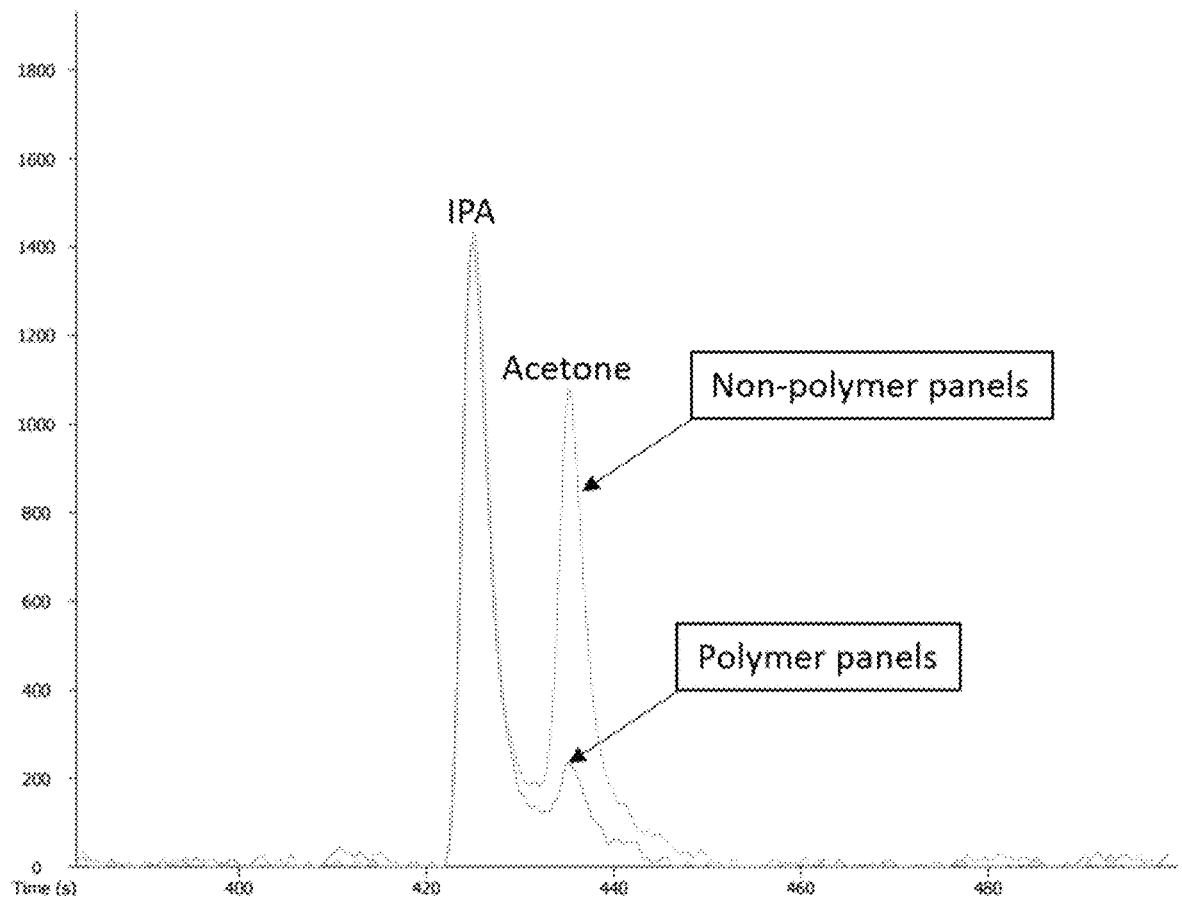
FIG. 35 is a GC/MS spectrum illustrating the presence of acetone, an IPA degradation product, during the experiments of FIGS. 33 and 34.

Test Panels Using Polymer Paints or Stucco-Like Blends Containing Nanoparticle-Decorated Diatom Frustules The polymer paints or stucco-like blends containing titanium oxide nanoparticle-decorated diatom frustules or iron/titanium oxide nanoparticle-decorated diatom frustules can be used to coat most common substrates, including concrete, wood, glass, ceramic, metal panel, polymer surface, etc. Any technique for applying paint to a substrate, such as a roller, brush and/or spray can be used to apply the mixture. For example, FIG. 32 shows glass panels (about 4" wide and 10" long) painted with a polymer paint containing titanium oxide nanoparticle-decorated diatom frustules.

The glass panels were inserted into a custom glass flask that was sealed for testing. The flask head was separated from the body with a Teflon gasket and sealed with a metal clamp. Sampling and analysis was completed using the same methods described in Example 10.

FIGS. 33 and 34 show the degradation of IPA over time by panels coated with paints containing exemplary embodiments of the disclosed composition. FIG. 33 shows the degradation by a polymer paint comprising 40% titanium oxide nanoparticle-decorated diatom frustules. The initial degradation was 3.9% in the first hour and degradation continued as the experiment progressed. FIG. 34 shows the degradation by a stucco-like blend comprising 40% iron/titanium oxide nanoparticle-decorated diatom frustules. The initial degradation was 18.8% in the first hour and degradation continued with an exponential decay as the experiment progressed. In both experiments, the degradation was a continuous process.

Although both stucco-like blend and polymer panels containing titanium oxide nanoparticle-decorated diatom frustules demonstrated similar final IPA changes in the long-term, the stucco-like blend panels were quicker to react to large changes in VOC concentration, while the polymer paints were more linear in response (FIG. 35). In addition, acetone was detected for both the non-polymer and polymer panels, a well-known byproduct of IPA degradation. The presence of acetone taken during the middle of testing confirms the process is actively degrading IPA. MTBE internal standards were used to normalize each instrument response as a double-confirmation of degradation behavior of both panel sets.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A composition, comprising:

a hollow cylindrical diatom frustule; and two or more first photocatalytic metal oxide nanoparticles dispersed on a surface of the diatom frustule such that each nanoparticle is separate and not in direct physical contact with another first photocatalytic metal oxide nanoparticle, the two or more first photocatalytic metal oxide nanoparticles comprising an oxide of a metal selected from titanium, iron, copper or zinc; and two or more second photocatalytic metal oxide nanoparticles dispersed on the hollow cylindrical diatom frustule, the second photocatalytic metal oxide nanoparticles comprising an oxide of a second metal selected from titanium, iron, copper, or zinc, the second metal being different from the first metal;

wherein a portion of the surface of the hollow cylindrical diatom frustule is free from metal oxide.

2. The composition of claim 1, wherein the two or more first photocatalytic metal oxide nanoparticles are separated from each other by an average distance of from greater than 0 nm to 100 nm.

3. The composition of claim 1, wherein the first photocatalytic metal oxide nanoparticles have a size of from greater than 0 to less than 100 nm.

4. The composition of claim 1, wherein the first metal oxide photocatalytic nanoparticles comprise titanium oxide nanoparticles.

5. The composition of claim 4, wherein the second photocatalytic metal oxide nanoparticles comprise iron oxide nanoparticles.

6. The composition of claim 1, further comprising a dopant.

7. A device, comprising the composition according to claim 1.

8. The device of claim 7, wherein the device is an air filtration system.

9. The device of claim 8, wherein the device comprises a filter comprising the composition.

10. The device of claim 7, wherein the device is a fabric.

11. The device of claim 7, wherein the device comprises a surface comprising a coating that comprises the composition.

12. The device of claim 7, wherein the composition comprises titanium oxide nanoparticles.

13. A method, comprising exposing the composition of claim 1 to a volatile organic compound such that the composition degrades the volatile organic compound to a non-toxic product.

14. The method of claim 13, wherein exposing the composition comprises exposing the composition to a stream of air comprising the volatile organic compound.

15. The method of claim 13, wherein exposing the composition comprises exposing the composition to a stream of water comprising the volatile organic compound.

16. The method of claim 13, wherein exposing the composition comprises applying the composition to a surface.

17. The method of claim 16, wherein the surface is an interior or exterior wall.

18. A composition, comprising:
a hollow cylindrical diatom frustule comprising an interior surface and an exterior surface, the hollow cylindrical diatom frustule comprising a surface area of between 20 and 200 $m^2/g$ and a diameter of between 2 and 500 μm; and
two or more titanium oxide nanoparticles dispersed on each of the interior and exterior surfaces of the hollow cylindrical diatom frustule such that each titanium oxide nanoparticle is separate and not in direct physical contact with another titanium oxide nanoparticle; and
two or more iron oxide nanoparticles dispersed on each of the interior and exterior surfaces.

19. A composition, comprising:
a hollow cylindrical diatom frustule comprising an interior surface and an exterior surface, the hollow cylindrical diatom frustule comprising a surface area of between 20 and 200 $m^2/g$ and a diameter of between 2 and 500 um;
two or more first photocatalytic metal oxide nanoparticles dispersed on each of the interior and exterior surfaces of the hollow cylindrical diatom frustule such that each of the first photocatalytic metal oxide nanoparticles is separate and not in direct physical contact with another first photocatalytic metal oxide nanoparticle, the first photocatalytic metal oxide nanoparticles comprising an oxide of a first metal selected from titanium, iron, copper, or zinc; and
two or more second photocatalytic metal oxide nanoparticles dispersed on each of the interior and exterior surfaces, the second photocatalytic metal oxide nanoparticles comprising an oxide of a second metal selected from titanium, iron, zinc, or copper, the second metal being different from the first metal; and
wherein at least a portion of the interior and exterior surfaces of the hollow cylindrical diatom frustule is free from metal oxide.

* * * * *